US012709651B2

(12) United States Patent
Roller et al.

(10) Patent No.: US 12,709,651 B2
(45) Date of Patent: Aug. 18, 2026

(54) WATERBASED BINDER FOR TWO-COMPONENT COATING COMPOSITION

(71) Applicant: BASF SE, Ludwigshafen am Rhein (DE)

(72) Inventors: Sebastian Roller, Ludwigshafen am Rhein (DE); Quirin Maximilian Kainz, Ludwigshafen am Rhein (DE); Chintankumar Jayantilal Patel, Ludwigshafen am Rhein (DE); Rabie Al-Hellani, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 579 days.

(21) Appl. No.: 18/038,224

(22) PCT Filed: Nov. 15, 2021

(86) PCT No.: PCT/EP2021/081712
§ 371 (c)(1),
(2) Date: May 23, 2023

(87) PCT Pub. No.: WO2022/112042
PCT Pub. Date: Jun. 2, 2022

(65) Prior Publication Data

US 2024/0052068 A1 Feb. 15, 2024

(30) Foreign Application Priority Data

Nov. 26, 2020 (EP) .................................... 20210088

(51) Int. Cl.
*C08F 2/38* (2006.01)
*C08F 2/00* (2006.01)
(Continued)

(52) U.S. Cl.
CPC ................ *C08F 2/38* (2013.01); *C08F 2/001* (2013.01); *C08F 2/26* (2013.01); *C08F 265/06* (2013.01);
(Continued)

(58) Field of Classification Search
CPC ............... C08L 51/00; C08L 33/00–14; C09D 151/003; C09D 133/00–14;
(Continued)

(56) References Cited

U.S. PATENT DOCUMENTS 2,520,959 A 9/1950 Powers
3,397,165 A 8/1968 Donald et al.
(Continued)

FOREIGN PATENT DOCUMENTS

DE 4003422 A1 8/1991
DE 19624299 A1 1/1997
(Continued)

OTHER PUBLICATIONS

International Search Report and Written Opinion received for PCT Patent Application No. PCT/EP2021/081712, mailed on Mar. 31, 2022, 7 pages.

*Primary Examiner* — Kregg T Brooks
(74) *Attorney, Agent, or Firm* — Faegre Drinker Biddle & Reath LLP

(57) ABSTRACT

The present invention relates process for preparing an aqueous polymer dispersion by radically initiated aqueous emulsion polymerization, which comprises polymerizing, in an aqueous polymerization medium a) in a first polymerization stage≥0.5 and ≤15 wt % of at least one α,β-monoethylenically unsaturated $C_3$ to $C_6$ monocarboxylic or dicarboxylic acid (monomers A1), ≥5 and ≤40 wt % of at least one monoethylenically unsaturated compound having at least one hydroxyl group (monomers B1), ≥0-≤40 wt % of carboxyl-free (meth)acrylic esters with a cycloaliphatic structure (monomers C1), ≥15 and ≤94.5 wt % of at least one ethylenically unsaturated compound which is different from the monomers A1, B1 and C1 (monomers D1), the amounts of the monomers A1 to D1 adding up to 100 wt %, in the presence of at least one radical initiator and at least one chain transfer agent, and also, optionally, in the presence of a dispersing assistant, with the provisos that•the amount of chain transfer agent is selected such that the polymer 1 obtained from the first polymerization stage has a weight-average molecular weight in the range of ≥5000 and ≤40000 g/mol, •the nature and amounts of the monomers A1 to D1 are selected such that the resulting polymer 1 has a glass transition temperature $Tg^1$ as measured to DIN EN ISO 11357-2 (2013 September)≥15° C., and thereafter polymerizing, in the presence of the polymer 1 b) in a second polymerization stage≥0 and ≤1.0 wt % of at least one α,β-monoethylenically unsaturated $C_3$ to $C_6$ monocarboxylic or dicarboxylic acid (monomers A2), ≥0.1 and ≤40 wt % of at least one monoethylenically unsaturated compound having at least one hydroxyl group (monomers B2), ≥0-≤40 wt % of carboxyl-free (meth)acrylic esters with a cycloaliphatic structure (monomers C2)≥30 and ≤99.9 wt % of at least one ethylenically unsaturated compound which is different from the monomers A2, B2 and C2 (monomers D2), the amounts of the monomers A2 to D2 adding up to 100 wt %, in the presence of at least one radical initiator and at least one chain transfer agent, and also, optionally, in the presence of a dispersing assistant, with the provisos that•the weight ratio of the sum of the total amounts of monomers A1 to D1 (total monomer amount 1) to the sum of the total amounts of monomers A2 to D2 (total monomer amount 2) is in the range 25:75 to 50:50, •the amount of chain transfer agent in the second polymerization stage is selected such that the overall polymer obtained after the second polymerization stage has a weight-average molecular weight≥5000 and ≤75000/mol, and•the amount of the dispersing assistant is
(Continued)

≤3.0 wt %, based on the sum of total monomer amount 1 and total monomer amount 2 (total monomer amount), •that the sum of the total amounts of monomers C1 and C2 is 7 to 40 wt % based on the sum of total monomer amount 1 and total monomer amount 2; the aqueous polymer dispersion itself, its use and coating compositions comprising the aqueous polymer dispersion.

14 Claims, No Drawings

(51) Int. Cl.
*C08F 2/26* (2006.01)
*C08F 265/06* (2006.01)
*C09D 7/20* (2018.01)
*C09D 133/12* (2006.01)
*C09D 151/00* (2006.01)

(52) U.S. Cl.
CPC ............ *C09D 7/20* (2018.01); *C09D 133/12* (2013.01); *C09D 151/003* (2013.01)

(58) Field of Classification Search
CPC ........ C08F 265/00–06; C08F 220/1086; C08F 220/1811; C08F 2/001; C08F 2/38
See application file for complete search history.

(56) References Cited

U.S. PATENT DOCUMENTS 4,269,749 A 5/1981 Marriott et al.
4,596,678 A 6/1986 Merger et al.
4,596,679 A 6/1986 Hellbach et al.
5,081,166 A 1/1992 Kiehlbauch et al.
5,087,739 A 2/1992 Bohmholdt et al.
5,401,582 A 3/1995 Weyland et al.
5,994,457 A 11/1999 Stanger et al.
6,096,858 A 8/2000 Dobbelaar et al.
10,259,967 B2 4/2019 Tromsdorf et al.
2004/0034164 A1* 2/2004 Melchiors ................ C08F 8/44 524/608
2017/0355872 A1* 12/2017 Tromsdorf .......... C09D 133/02

FOREIGN PATENT DOCUMENTS

DE 19621027 A1 11/1997
DE 19741184 A1 3/1999
DE 19741187 A1 3/1999
DE 19805122 A1 4/1999
DE 19828183 A1 12/1999
DE 19839199 A1 3/2000
DE 19840586 A1 3/2000
DE 19847115 C1 5/2000
DE 10013186 A1 9/2001
DE 10013187 A1 10/2001
EP 0126299 A1 11/1984
EP 0126300 A1 11/1984
EP 0338486 A2 10/1989
EP 0355443 A2 2/1990
EP 0758347 A1 2/1997
EP 0771328 A1 5/1997
WO 95/29944 A1 11/1995
WO 2005/087828 A1 9/2005
WO 2008/068198 A1 6/2008
WO 2008/124136 A1 10/2008
WO 2012/140042 A1 10/2012
WO 2016/087240 A1 6/2016

* cited by examiner

WATERBASED BINDER FOR TWO-COMPONENT COATING COMPOSITION

CROSS-REFERENCE TO RELATED APPLICATIONS

This application is a National stage application (under 35 U.S.C. § 371) of PCT/EP2021/081712, filed Nov. 15, 2021, which claims benefit of European Application No. 20210088.9, filed Nov. 26, 2020, both of which are incorporated herein by reference in their entirety.

The present invention provides a process for preparing an aqueous polymer dispersion by radically initiated aqueous emulsion polymerization with two polymerization stages, wherein in the presence of the polymer 1 obtained from the first polymerization stage a second polymerization stage is conducted, and this polymer 1 has a weight-average molecular weight in the range of 5000 to 40 000 g/mol.

The starting point in the prior art for the present invention is as follows:

If emulsion polymers are used as binders for coatings of substrates, one of the important requirements of such coatings is that they show a fast property development, i.e., fast hardness development or fast drying. One approach is the polymerization with an "in-situ" seed, wherein in advance of the actual emulsion polymerization a small subset of monomers is subjected to free-radical polymerization in the presence of a large quantity of emulsifier and then the actual emulsion polymerization is polymerized in presence of this "in situ" seed. If especially finely divided polymer dispersions are needed, a particularly large quantity of emulsifier is required. The foam-forming propensity of the polymer dispersions, which as a result are very rich in emulsifier, is high.

One elegant way of saving on emulsifier during preparation and processing, while retaining the stability, is to prepare "invert" or "inverted" core-shell polymers. Such polymers were described as far back as in EP 338486. In these case, a carboxyl-rich monomer composition is first polymerized by means of a 'conventional' emulsion polymerization procedure, often in the presence of a small amount of emulsifier and a chain transfer agent, which, following a 'swelling step' with aqueous alkali (U.S. Pat. No. 5,081,166) or complete neutralization of the carboxyl groups and dissolution of the polymer particles (EP 758347), functions as a stabilizer for the next polymerization steps. For polymers of this kind, in the first monomer composition, in general, fairly high quantities of monomers which carry carboxyl groups, or monomers with latent carboxyl functionality, are used, which leads to further disadvantages.

WO 2012/140042 describes conventional two-stage emulsion polymers synthesized from a hydroplasticizable, acid-rich first polymerization stage having a glass transition temperature in the range from 10 to 125° C., and a second, lower-acid-content polymerization stage, having an acid number of not more than 23 mg KOH/g polymer. In a list of monomers, among others isobornyl (meth) acrylate and cyclohexyl (meth) acrylate are also mentioned. Hydroxy-function monomers are mentioned as optional monomers with further functional groups in another list.

Conversely, WO 2008/124136 discloses a multistage emulsion polymer which consists of an acid-rich first polymer having an acid number of 10 to 100 mg KOH/g polymer, the acid groups being neutralized. The polymer of the second polymerization stage has an acid number<5 mg KOH/g polymer, has a hydroxyl number<5 mg KOH/g polymer, and comprises 0.5 to 5 wt % of a polyunsaturated monomer in copolymerized form. In the list of monomers, among others isobornyl (meth) acrylate and cyclohexyl (meth) acrylate are also mentioned.

WO 2016/087240 teaches a binder system for high-gloss coatings wherein in a first polymerization stage methacrylic acid together with alkyl (meth) acrylates, styrene and hydroxyethyl methacrylate in the presence of a regulator is radically polymerized and polymerized in the presence of the resulting polymer in a second polymerization stage butyl acrylate, methyl methacrylate and hydroxyethyl methacrylate. Even if formulations show improvements in gloss there is still a need for improvement in terms of drying speed and hardness development in varnishes.

It was an object of the present invention to provide polymer dispersions for coating compositions that can be produced as far as possible without dispersing assistant, or with only a small amount of dispersing assistant, and that lead to coatings having acceptable gloss characteristics and a relatively low haze and good drying times for a wide range of drying tests.

The underlying problem was to provide OH-functional acrylic dispersions for water-based two-component coatings systems, which provide faster drying and/or hardness development compared to hitherto systems, still having a sufficient gloss.

These and other objects are achieved by a process for preparing an aqueous polymer dispersion by radically initiated aqueous emulsion polymerization, which comprises polymerizing, in an aqueous polymerization medium a) in a first polymerization stage ≥0.5 and ≤15 wt % of at least one α,β-monoethylenically unsaturated $C_3$ to $C_3$ monocarboxylic or dicarboxylic acid (monomers A1), ≥5 and ≤40 wt % of at least one monoethylenically unsaturated compound having at least one hydroxyl group (monomers B1), ≥0-≤40 wt % of carboxyl-free (meth)acrylic esters with a cycloaliphatic structure (monomers C1), ≥15 and ≤94.5 wt % of at least one ethylenically unsaturated compound which is different from the monomers A1, B1 and C1 (monomers D1), the amounts of the monomers A1 to D1 adding up to 100 wt %, in the presence of at least one radical initiator and at least one chain transfer agent, and also, optionally, in the presence of a dispersing assistant, with the provisos that the amount of chain transfer agent is selected such that the polymer 1 obtained from the first polymerization stage has a weight-average molecular weight in the range of ≥5000 and ≤40 000 g/mol, the nature and amounts of the monomers A1 to D1 are selected such that the resulting polymer 1 has a glass transition temperature $Tg^1$ as measured to DIN EN ISO 11357-2 (2013 September)≥15° C., and thereafter polymerizing, in the presence of the polymer 1 b) in a second polymerization stage

≥0 and ≤1.0 wt % of at least one α,β-monoethylenically unsaturated $C_3$ to $C_6$ monocarboxylic or dicarboxylic acid (monomers A2), ≥0.1 and ≤40 wt % of at least one monoethylenically unsaturated compound having at least one hydroxyl group (monomers B2), ≥0-≤40 wt % of carboxyl-free (meth)acrylic esters with a cycloaliphatic structure (monomers C2), ≥30 and ≤99.9 wt % of at least one ethylenically unsaturated compound which is different from the monomers A2, B2 and C2 (monomers D2), the amounts of the monomers A2 to D2 adding up to 100 wt %, in the presence of at least one radical initiator and at least one chain transfer agent, and also, optionally, in the presence of a dispersing assistant, with the provisos that the weight ratio of the sum of the total amounts of monomers A1 to D1 (total monomer amount 1) to the sum of the total amounts of monomers A2 to D2 (total monomer amount 2) is in the range 25:75 to 50:50, the amount of chain transfer agent in the second polymerization stage is selected such that the overall polymer obtained after the second polymerization stage has a weight-average molecular weight≥5000 and ≤75 000/mol, and the amount of the dispersing assistant is ≤3.0 wt %, based on the sum of total monomer amount 1 and total monomer amount 2 (total monomer amount), that the sum of the total amounts of monomers C1 and C2 is 7 to 40 wt % based on the sum of total monomer amount 1 and total monomer amount 2.

The present invention further relates to the aqueous polymer dispersion itself and to the use thereof in any of a very wide variety of fields of application, more particularly for producing two-component waterbased coatings. The invention further relates to coating compositions comprising the aqueous polymer dispersion.

According to the present invention the polymer obtained by the inventive process comprises 7 to 40 wt % based on the total monomer amount are carboxyl-free (meth)acrylic esters with a cycloaliphatic structure (monomers C) in copolymerized form.

In the following the notation "(meth)acrylic acid" compounds or "(meth)acrylate" compounds is intended generally to comprise not only the corresponding acrylic acid compounds but also the corresponding methacrylic acid compounds.

The implementation of radically initiated emulsion polymerizations of ethylenically unsaturated compounds (monomers) in an aqueous medium has been the subject of many prior descriptions and is therefore sufficiently well-known to the skilled person [in this regard, see Emulsion Polymerization in Encyclopedia of Polymer Science and Engineering, vol. 8, pages 659 ff. (1987); D. C. Blackley, in High Polymer Latices, vol. 1, pages 35 ff. (1966); H. Warson, The Applications of Synthetic Resin Emulsions, chapter 5, pages 246 ff. (1972); D. Diederich, Chemie in unserer Zeit 24, pages 135 to 142 (1990); Emulsion Polymerization, Interscience Publishers, New York (1965); DE-A 40 03 422 and Dispersionen synthetischer Hochpolymerer, F. Hölscher, Springer-Verlag, Berlin (1969)]. The usual format for the radically initiated aqueous emulsion polymerization is that the monomers are dispersed in the aqueous medium, generally with accompaniment of dispersing assistants, such as emulsifiers and/or protective colloids, and are polymerized by means of at least one water-soluble radical polymerization initiator. In the aqueous polymer dispersions obtained, the residual levels of unreacted monomers are frequently lowered by means of chemical and/or physical methods that are likewise known to the skilled person [see, for example, EP-A 771328, DE-A 19624299, DE-A 19621027, DE-A 19741184, DE-A 19741187, DE-A 19805122, DE-A 19828183, DE-A 19839199, and DE-A 19840586 and 19847115], the polymer solids content is adjusted to a desired figure by dilution or concentration, or further customary adjuvants, such as foam or viscosity modifier additives, for example, are added to the aqueous polymer dispersion. The process of the invention differs from this general procedure only in that it is implemented in two stages in compliance with the framework parameters stated.

For preparing the aqueous polymer dispersions obtainable by the process of the invention, by two-stage aqueous emulsion polymerization, the following ethylenically unsaturated monomers A1, A2, B1, B2, C1, C2, D1 and D2 may be used:

Monomers A1 and A2 contemplated include all α,β-monoethylenically unsaturated $C_3$ to $C_6$, preferably $C_3$ or $C_4$ monocarboxylic or dicarboxylic acids, such as, for example, acrylic acid, methacrylic acid, ethyl acrylic acid, itaconic acid, allyl acetic acid, crotonic acid, vinyl acetic acid, fumaric acid, maleic acid, and 2-methylmaleic acid. The monomers A1 and A2, however, also comprise the anhydrides of corresponding α,β-monoethylenically unsaturated dicarboxylic acids, such as maleic anhydride or 2-methylmaleic anhydride, for example. The monomers A1 and A2 are preferably selected from the group comprising acrylic acid, methacrylic acid, crotonic acid, fumaric acid, maleic acid, 2-methylmaleic acid, and itaconic acid, with acrylic acid and/or methacrylic acid being particularly preferred. The monomers A1 and A2 of course also comprise the fully or partly neutralized, water-soluble salts, more particularly the alkali metal salts or ammonium salts, of the aforementioned acids.

Monomers B1 and B2 contemplated include all monoethylenically unsaturated compounds having at least one hydroxyl group, such as, more particularly, all hydroxyalkyl, advantageously hydroxy-$C_2$-$C_{10}$-alkyl, preferably hydroxy-$C_2$-$C_4$-alkyl, and particularly advantageously hydroxy-$C_2$-$C_3$-alkyl acrylates and/or methacrylates; for the purposes of this specification, the alkoxylated hydroxyalkyl acrylates and/or methacrylates, i.e., those reacted with alkylene oxides (essentially ethylene oxide and propylene oxide), are also to be regarded as monomers B1 and B2. With advantage, the hydroxyalkyl-containing monomers B1 and B2 are selected from the group comprising diethylene glycol monoacrylate, 4-hydroxybutyl acrylate, 3-hydroxypropyl acrylate, 2-hydroxypropyl acrylate, 2-hydroxyethyl acrylate, diethylene glycol monomethacrylate, 4-hydroxybutyl methacrylate, 3-hydroxypropyl methacrylate, 2-hydroxypropyl methacrylate, and 2-hydroxyethyl methacrylate. Used with more particular advantage are 2-hydroxyethyl acrylate and/or 2-hydroxyethyl methacrylate, with 2-hydroxyethyl methacrylate being particularly preferred.

The monomers B1 and B2 are also intended to comprise those hydroxyalkyl acrylates and methacrylates which have more than one hydroxyl group, as for example two to five, preferably two to four, more preferably two to three hydroxyl groups. Examples thereof are glycerol monoacrylate and monomethacrylate, trimethylolpropane monoacrylate and monomethacrylate, pentaerythritol monoacrylate and monomethacrylate, and also monoacrylates and monomethacrylates of sugar alcohols, such as, for example, sorbitol, mannitol, diglycerol, threitol, erythritol, adonitol (ribitol), arabitol (lyxitol), xylitol, dulcitol (galactitol), maltitol, and isomalt.

Monomers C1 and C2 contemplated include all carboxyl-free acrylic esters and/or carboxyl-free methacrylic esters with a cycloaliphatic structure preferably isobornyl methacrylate, isophoryl methacrylate, cyclohexyl methacrylate, 4-tert-butylcyclohexyl (meth)acrylate, dicyclopentadiene acrylate and/or adamantyl acrylate preferred are isobornyl methacrylate and/or cyclohexyl methacrylate.

Monomers D1 and D2 contemplated include in principle all ethylenically unsaturated compounds which are different from the monomers A1, A2, B1, B2, C1 and C2, such as (meth)acrylic acid alkyl esters, the preferred intention being to comprise those (meth)acrylic acid alkyl esters whose linear or branched alkyl residue has 1 to 20 carbon atoms, more preferably 1 to 10, very preferably 1 to 8, and more particularly 1 to 4 carbon atoms.

Examples of (meth)acrylic acid alkyl esters include methyl (meth)acrylate, ethyl (meth)acrylate, n-propyl (meth)acrylate, n-butyl (meth)acrylate, isobutyl (meth)acrylate, sec-butyl (meth)acrylate, n-pentyl (meth)acrylate, isopentyl (meth)acrylate, 2-methylbutyl (meth)acrylate, amyl (meth)acrylate, n-hexyl (meth)acrylate, 2-ethylbutyl (meth) acrylate, pentyl (meth)acrylate, n-heptyl (meth)acrylate, n-octyl (meth)acrylate, 2-ethylhexyl (meth)acrylate, 2-propylheptyl (meth)acrylate, n-decyl (meth)acrylate, undecyl (meth)acrylate and/or n-dodecyl (meth)acrylate.

Preferred (meth)acrylic acid alkyl esters are methyl methacrylate, methyl acrylate, ethyl acrylate, n-butyl acrylate, n-hexyl acrylate, n-octyl acrylate, 2-ethylhexyl acrylate and/or 3-propylheptyl acrylate.

Monomers D1 and D2 contemplated also include vinylaromatics having up to 20 C atoms.

The vinylaromatics having up to 20 C atoms are optionally substituted aromatic systems with a vinyl group which is situated in conjugation with the aromatic ring system.

Such substituted vinylaromatics frequently have one or more, linear or branched alkyl groups which have preferably 1 to 10 carbon atoms, often 1 to 6, and preferably 1 to 4 carbon atoms, and which may be located on the aromatic moiety or on the vinyl group. Where the substituent is located on the aromatic moiety, the substituent may be located preferably in ortho- or para-position, more preferably in para-position to the vinyl group.

Vinylaromatic compounds contemplated include, in particular, vinyltoluene, vinylnaphthalene, α- and p-methylstyrene, α-butylstyrene, 4-n-butylstyrene, 4-n-decylstyrene and/or styrene, but with styrene and/or α-methylstyrene being particularly preferred.

The monomers D1 and D2 further comprise ethylenically unsaturated nitriles having up to 20 C atoms, such as, more particularly, fumaronitrile, acrylonitrile, and methacrylonitrile, preferably acrylonitrile and methacrylonitrile, and more preferably acrylonitrile; vinyl esters of carboxylic acids comprising up to 20 C atoms, such as, more particularly, vinyl laurate, vinyl stearate, vinyl propionate, vinyl esters of versatic acid, vinyl butyrate, and vinyl acetate, but preferably vinyl acetate; vinyl halides and vinylidene halides having up to 10 C atoms, such as, more particularly, ethylenically unsaturated compounds substituted by chlorine, fluorine, or bromine, preferably vinyl chloride and vinylidene chloride; and vinyl ethers of alcohols comprising 1 to 10 C atoms, such as, advantageously, methyl vinyl ether, ethyl vinyl ether, n-propyl vinyl ether, isopropyl vinyl ether, n-butyl vinyl ether, sec-butyl vinyl ether, isobutyl vinyl ether, tert-butyl vinyl ether, and n-octyl vinyl ether, with vinyl ethers of alcohols comprising 1 to 4 C atoms being preferred.

To a minor degree, i.e., ≤20 wt %, advantageously ≤10 wt %, and especially advantageously≤5 wt %, based in each case on the total amount of the monomers D1 and/or D2, the monomers D1 and D2 may also comprise the following, functionalized ethylenically unsaturated monomers:

Organic compounds which have at least two nonconjugated ethylenically unsaturated groups, di- and poly(meth) acrylates, 1,2-, 1,3-, and 1,4-butanediol diacrylate, 1,2- and 1,3-propylene glycol (meth)acrylate, 1,6-hexanediol di(meth)acrylate, 1,2-ethylene glycol di(meth)acrylate, neopentyl glycol di(meth)acrylate, diethylene glycol di(meth)acrylate, triethylene glycol di(meth)acrylate, tetraethylene glycol di(meth)acrylate, trimethylolpropane tri(meth)acrylate, trimethylolethane tri(meth)acrylate, pentaerythritol tri- and tetra(meth)acrylate, 1,2-, 1,3-, and 1,4-divinylbenzene, and also mixtures thereof. More preferably the compounds are selected from the group consisting of divinylbenzene, 1,4-butanediol diacrylate, and allyl methacrylate.

Further functionalized ethylenically unsaturated compounds which can be used in accordance with the invention are selected from the group consisting of 2-(2-oxoimidazolidin-1-yl)ethyl (meth)acrylate (ureidoethyl (meth)acrylate), N-[2-(2-oxooxazolidin-3-yl)ethyl] methacrylate, acetoacetoxyethyl acrylate, acetoacetoxypropyl methacrylate, acetoacetoxybutyl methacrylate, 2-(acetoacetoxy)ethyl methacrylate, diacetoneacrylamide (DAAM), and diacetonemethacrylamide. Preferred in this group are 2-(2-oxoimidazolidin-1-yl) ethyl (meth)acrylate, (acetoacetoxy)ethyl methacrylate, diacetoneacrylamide and/or diacetonemethacrylamide, more preferably 2-(2-oxoimidazolidin-1-yl)-ethyl (meth)acrylate and (acetoacetoxy)ethyl methacrylate.

The functionalized ethylenically unsaturated compounds which can be used in accordance with the invention also include compounds having a (meth)acrylate group and an epoxy group. Particularly noteworthy are glycidyl acrylate and glycidyl methacrylate, preferably glycidyl methacrylate.

The functionalized ethylenically unsaturated compounds which can be used in accordance with the invention further include α,β-ethylenically unsaturated carboxamides, preferably the amides of the monomers A1 and A2, with preference being given to (meth)acrylamide, crotonamide, or amides of dicarboxylic acids, examples being itaconamide, maleamide, or fumaramide. Particularly preferred are methacrylamide and/or acrylamide, with acrylamide being especially preferred.

It is important in accordance with the invention that the aforementioned monomers A1 and/or A2, B1 and/or B2, C1 and/or C2 and D1 and/or D2 are used individually or else as mixtures. Of the monomers A1 to D1 and A2 to D2, respectively, the total amounts or portions can in each case be included in the initial charge in the aqueous polymerization medium, before the polymerization reaction is initiated, and any remaining portions can be metered in under polymerization conditions. It is, however, also possible to meter the total amounts of monomers A1 to D1 and/or A2 to D2 into the aqueous polymerization medium under polymerization conditions. With advantage, in the first polymerization stage, at least a portion≤10 wt % of the monomers A1 to D1 is included in the initial charge in the aqueous polymerization medium, before the polymerization reaction is initiated, and the remainder is metered into the aqueous polymerization medium under polymerization conditions, whereas, in the second polymerization stage, the total amount of the monomers A2 to D2 is metered into the aqueous polymerization medium under polymerization conditions. Here, the monomers A1 to D1 and/or A2 to D2 may be metered into the aqueous polymerization medium in each case as individual streams, as a monomer mixture, or in the form of an aqueous monomer emulsion, discontinuously, and also continuously with constant or changing flow rates.

With particular advantage, however, the monomers of the first and second polymerization stages are used in each case as monomer mixtures. Advantageously, at least a part of the monomer mixtures of the first and second polymerization stages is metered into the aqueous polymerization medium under polymerization conditions.

The radically initiated aqueous emulsion polymerization for preparing the dispersion polymers is carried out generally in the presence of 0.1 to 5 wt %, preferably 0.1 to 4 wt %, and more particularly 0.1 to 3 wt %, based in each case on the total monomer amount (corresponding to the sum of total monomer amount 1 and total monomer amount 2), of a radical polymerization initiator (radical initiator). Radical initiators contemplated include all those capable of initiating a radical aqueous emulsion polymerization. These may in principle be both peroxides and azo compounds. It will be appreciated that redox initiator systems are also contemplated. As peroxides it is possible in principle to use inorganic peroxides, such as hydrogen peroxide or peroxodisulfates, such as the mono- or di-alkali metal or ammonium salts of peroxodisulfuric acid, such as its mono- and disodium, -potassium, or ammonium salts, for example, or organic peroxides, such as alkyl hydroperoxides, examples being tert-butyl, p-menthyl, or cumyl hydroperoxide, and also dialkyl or diaryl peroxides, such as di-tert-butyl peroxide or dicumyl peroxide. As azo compound, use is made substantially of 2,2'-azobis(isobutyronitrile), 2,2'-azobis(2,4-dimethylvaleronitrile), and 2,2'-azobis(amidinopropyl) dihydrochloride (AIBA, corresponding to V-50 from Wako Chemicals). It will be appreciated that systems known as redox initiator systems can also be used as radical initiators. Oxidizing agents contemplated for redox initiator systems are essentially the peroxides identified above. As corresponding reducing agents it is possible to use sulfur compounds with a low oxidation state, such as alkali metal sulfites, as for example potassium and/or sodium sulfite, alkali metal hydrogensulfites, as for example potassium and/or sodium hydrogensulfite, alkali metabisulfites, as for example potassium and/or sodium metabisulfite, formaldehyde-sulfoxylates, as for example potassium and/or sodium formaldehyde-sulfoxylate, alkali metal salts, especially potassium salts and/or sodium salts of aliphatic sulfinic acids, and alkali metal hydrogensulfides, such as potassium and/or sodium hydrogensulfide, for example, salts of polyvalent metals, such as iron(II) sulfate, iron(II) ammonium sulfate, iron(II) phosphate, enediols, such as dihydroxymaleic acid, benzoin and/or ascorbic acid, and also reducing saccharides, such as sorbose, glucose, fructose and/or dihydroxyacetone.

Initiation of the polymerization reaction means the start of the polymerization reaction of the monomers present in the polymerization vessel, after radical formation by the radical initiator. This initiation of the polymerization reaction may be accomplished by adding radical initiator to the aqueous polymerization mixture in the polymerization vessel under polymerization conditions. Another possibility, however, is to add a portion or the entirety of the radical initiator to the aqueous polymerization mixture, comprising the initially introduced monomers, in the polymerization vessel, under conditions not apt to trigger a polymerization reaction—at low temperature, for example—and thereafter to bring about polymerization conditions in the aqueous polymerization mixture. Polymerization conditions here are, generally, those temperatures and pressures at which the radically initiated aqueous emulsion polymerization proceeds with sufficient polymerization rate. They are dependent in particular on the radical initiator used. Advantageously, the nature and amount of the radical initiator, the polymerization temperature, and the polymerization pressure are selected such that the radical initiator has a half-life<3 hours and especially advantageously <1 hour and at the same time there are always sufficient initiating radicals available to initiate and maintain the polymerization reaction.

Reaction temperatures contemplated for the radically initiated aqueous emulsion polymerization span the whole range from 0 to 170° C. Temperatures employed here are generally from 50 to 120° C., preferably 60 to 110° C., and especially preferably 60 to 100° C. The radically initiated aqueous emulsion polymerization may be carried out at a pressure less than, equal to, or greater than 1 atm [1.013 bar (absolute), atmospheric pressure], and so the polymerization temperature may exceed 100° C. and may be up to 170° C. In the presence of monomers A1 to D2 having a low boiling point, the emulsion polymerization is carried out preferably under increased pressure. In that case the pressure may take on values of 1.2, 1.5, 2, 5, 10, or 15 bar (absolute) or even higher. If the emulsion polymerization is carried out under subatmospheric pressure, pressures of 950 mbar, frequently of 900 mbar and often 850 mbar (absolute), are set. The radical aqueous emulsion polymerization is carried out advantageously at 1 atm in the absence of oxygen, more particularly under inert gas atmosphere, such as under nitrogen or argon, for example.

In accordance with the invention, the entirety of the radical initiator may be included in the initial charge in the aqueous reaction medium before the polymerization reaction is initiated. Another possibility, however, is to include optionally only a portion of the radical initiator in the initial charge in the aqueous reaction medium before the polymerization reaction is initiated, and then to add the entirety or any remainder during the radically initiated emulsion polymerization, under polymerization conditions, at the rate of its consumption, continuously or discontinuously, in the first and/or second polymerization stages. It is of course possible to use different radical initiators in different amounts in the first and second polymerization stages. In a preferred embodiment, the entirety of the radical initiator is included in the initial charge in the aqueous reaction medium before the polymerization reaction is initiated.

Generally speaking, the total amount of radical initiators is ≥0.05 and ≤5 wt %, preferably ≥0.1 and ≤3 wt %, and more preferably ≥0.1 and ≤1.5 wt %, based in each case on the total monomer amount.

In order to set the weight-average molecular weights of the polymers formed in the first and second polymerization stages, compounds that bring about radical chain transfer (chain transfer agents) are used. Employed in this context essentially are aliphatic and/or araliphatic halogen compounds, such as, for example, n-butyl chloride, n-butyl bromide, n-butyl iodide, methylene chloride, ethylene dichloride, chloroform, bromoform, bromotrichloromethane, dibromodichloromethane, carbon tetrachloride, carbon tetrabromide, benzyl chloride, benzyl bromide, organic thio compounds, such as primary, secondary, or tertiary aliphatic thiols, such as, for example, ethanethiol, n-propanethiol, 2-propanethiol, n-butanethiol, 2-butanethiol, 2-methyl-2-propanethiol, n-pentanethiol, 2-pentanethiol, 3-pentanethiol, 2-methyl-2-butanethiol, 3-methyl-2-butanethiol, n-hexanethiol, 2-hexanethiol, 3-hexanethiol, 2-methyl-2-pentanethiol, 3-methyl-2-pentanethiol, 4-methyl-2-pentanethiol, 2-methyl-3-pentanethiol, 3-methyl-3-pentanethiol, 2-ethyl-butanethiol, 2-ethyl-2-butanethiol, n-heptanethiol and its isomeric compounds, n-octanethiol and its isomeric compounds, n-nonanethiol and its isomeric compounds, n-decanethiol and its isomeric compounds, n-undecanethiol and its isomeric compounds, n-dodecanethiol and its isomeric compounds, n-tridecanethiol and its isomeric compounds, substituted thiols, such as, for example, 2-hydroxyethanethiol, aromatic thiols, such as benzenethiol, ortho-, meta-, or para-methylbenzenethiol, mercaptoalkanoic acid and derivatives thereof, such as 6-methylheptyl 3-mercaptopropionate or 2-ethylhexyl 2-mercaptoethanoate, and all further sulfur compounds described in the third edition of the Polymer Handbook, 1989, J. Brandrup and E. H. Immergut, John Wiley & Sons, section II, pages 133 to 141 and also aliphatic and/or aromatic aldehydes, such as acetaldehyde, propionaldehyde and/or benzaldehyde, unsaturated fatty acids, such as oleic acid, dienes having nonconjugated double bonds, such as divinylmethane or vinylcyclohexane, or hydrocarbons having readily abstractable hydrogen atoms, such as toluene, for example. An alternative possibility is to use mixtures of mutually nondisruptive aforementioned chain transfer agents.

In accordance with the invention, the entirety of the chain transfer agent may be included in the initial charge in the aqueous reaction medium before the polymerization reaction is initiated. Another possibility, however, is to include optionally only a portion of the chain transfer agent in the initial charge in the aqueous reaction medium before the polymerization reaction is initiated, and then to add the entirety or any remainder during the radically initiated emulsion polymerization, under polymerization conditions, as and when required, continuously or discontinuously, in the first and/or second polymerization stages. It is of course possible to use different chain transfer agents in different amounts in the first and second polymerization stages. It is essential, however, that the nature and the amounts of the chain transfer agents in the first and second polymerization stages are selected such that the stated weight-average molecular weights are obtained.

Generally speaking, the amount of chain transfer agent in the first polymerization stage is ≥0.1 and ≤20 wt %, preferably ≥0.5 and ≤10 wt %, and more preferably ≥1.0 and ≤7.5 wt %, based in each case on the total monomer amount 1, and in the second polymerization stage is ≥0.1 and ≤10 wt %, preferably ≥0.1 and ≤5.0 wt %, and more preferably ≥0.1 and ≤2.0 wt %, based in each case on the total monomer amount 2.

The process of the invention may optionally also be carried out in the presence of dispersing assistants, which keep both the monomer droplets and polymer particles in dispersion in the aqueous phase and so ensure the stability of the aqueous dispersions produced of the dispersion polymers. Compounds contemplated as such dispersing assistants include emulsifiers as well as the protective colloids that are customarily used in the implementation of radical aqueous emulsion polymerizations.

Examples of suitable protective colloids are polyvinyl alcohols, cellulose derivatives, or copolymers comprising vinylpyrrolidone. A comprehensive description of further suitable protective colloids is found in Houben-Weyl, Methoden der organischen Chemie, volume XIV/1, Makromolekulare Stoffe [Macromolecular compounds], pages 411 to 420, Georg-Thieme-Verlag, Stuttgart, 1961. It will be appreciated that mixtures of emulsifiers and/or protective colloids can also be used. As dispersing assistant it is preferred to use exclusively emulsifiers, whose relative molecular weights, in contrast to the protective colloids, are customarily below 1000. They may be anionic, cationic, or nonionic in nature. Where mixtures of surface-active substances are used, the individual components must of course be compatible with one another, something which in the event of doubt can be verified by means of a few preliminary tests. Generally speaking, anionic emulsifiers are compatible with one another and with nonionic emulsifiers. The same also applies to cationic emulsifiers, whereas anionic and cationic emulsifiers are usually not compatible with one another. Customary emulsifiers are, for example, ethoxylated mono-, di-, and tri-alkylphenols (EO degree: 3 to 50, alkyl radical: $C_4$ to $C_{12}$), ethoxylated fatty alcohols (EO degree: 3 to 50; alkyl radical: $C_8$ to $C_{36}$), and alkali metal salts and ammonium salts of alkyl sulfates (alkyl radical: $C_8$ to $C_{12}$), of sulfuric monoesters with ethoxylated alkanols (EO degree: 4 to 30, alkyl radical: $C_{12}$ to $C_{18}$) and with ethoxylated alkylphenols (EO degree: 3 to 50, alkyl radical: $C_4$ to $C_{12}$), of alkylsulfonic acids (alkyl radical: $C_{12}$ to $C_{18}$), and of alkylarylsulfonic acids (alkyl radical: $C_9$ to $C_{18}$). Further suitable emulsifiers are found in Houben-Weyl, Methoden der organischen Chemie, volume XIV/1, Makromolekulare Stoffe [Macromolecular compounds], pages 192 to 208, Georg-Thieme-Verlag, Stuttgart, 1961.

Having further proven suitable as surface-active substances are compounds of the general formula I (I)

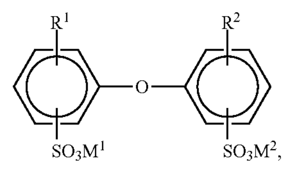

in which $R^1$ and $R^2$ are H atoms or $C_4$ to $C_{24}$ alkyl and are not simultaneously H atoms, and $M^1$ and $M^2$ may be alkali metal ions and/or ammonium ions. In the general formula (I), $R^1$ and $R^2$ are preferably linear or branched alkyl radicals having 6 to 18 C atoms, more particularly having 6, 12, and 16 C atoms, or are hydrogen, and $R^1$ and $R^2$ are not both simultaneously H atoms. $M^1$ and $M^2$ are preferably sodium, potassium, or ammonium, with sodium being particularly preferred. Particularly advantageous compounds (I) are those in which $M^1$ and $M^2$ are sodium, $R^1$ is a branched alkyl radical having 12 C atoms, and $R^2$ is an H atom or $R^1$. Use is frequently made of technical mixtures which have a fraction of 50 to 90 wt % of the monoalkylated product, such as, for example, Dowfax® 2A1 (brand name of the Dow Chemical Company). The compounds (I) are general knowledge, from U.S. Pat. No. 4,269,749, for example and are available commercially.

Where dispersing assistants are used in accordance with the invention, use is made advantageously of anionic and/or nonionic, and especially advantageously of anionic, surfactants.

In one specific embodiment of the present invention, emulsifiers used are those which are incorporated into the polymer in the course of the radical emulsion polymerization. These are generally compounds which carry at least one radically polymerizable group, preferably selected from the group consisting of allyl, acrylate, methacrylate, and vinyl ether, and at least one emulsifying group, preferably selected from the group indicated above.

These emulsifiers are, for example, incorporable emulsifiers with the brand names Bisomer® MPEG 350 MA from Laporte, Hitenol® BC-20 (APEO), Hitenol® BC-2020, Hitenol® KH-10 or Noigen® RN-50 (APEO) from Dai-Ichi Kogyo Seiyaku Co., Ltd., Maxemul® 6106, Maxemul® 6112, Maxemul® 5010, Maxemul® 5011 from Croda, Sipomer® PAM 100, Sipomer® PAM 200, Sipomer® PAM 300, Sipomer® PAM 4000, Sipomer® PAM 5000 from Rhodia, Adeka® Reasoap® PP-70, Adeka® Reasoap® NE-10, Adeka® Reasoap® NE-20, Adeka® Reasoap® NE-30, Adeka® Reasoap® NE-40, Adeka® Reasoap® SE-10N, Adeka® Reasoap® SE-1025A, Adeka® Reasoap® SR-10, Adeka® Reasoap® SR-1025, Adeka® Reasoap® SR-20, Adeka® Reasoap® ER-10, Adeka® Reasoap® ER-20, Adeka® Reasoap® ER-30, Adeka® Reasoap® ER-40 from Adeka, Pluriol® A 010 R, Pluriol® A 12 R, Pluriol® A 23 R, Pluriol® A 46 R, Pluriol® A 750 R, Pluriol® A 950 R, Pluriol® A 590 I, Pluriol® A 1190 I, Pluriol® A 590 V, Pluriol® A 1190 V, Pluriol® A 5890 V, Pluriol® A 308 R and DAA ES 8761 from BASF SE, Latemul® S 180 A and Latemul® S 180 from Kao, Eleminol® JS-2 from Sanyou Kasei, Aquaron® HS-1025 from Daiichi Kogyou Seiyaku and C12-AMPS from Lubrizol.

Essential to the process, however, is that the amount of optionally employed dispersing assistants is ≤3 wt %, advantageously≤1 wt %, and especially advantageously ≥0.3 and ≤0.7 wt %, based in each case on total monomer amount. The process of the invention can of course also be carried out in the absence of dispersants, however.

In accordance with the invention, the entirety of the optionally employed dispersing assistant may be included in the initial charge in the aqueous reaction medium before the polymerization reaction is initiated. Another possibility, however, is to include optionally only a portion of the dispersing assistant in the initial charge in the aqueous reaction medium before the polymerization reaction is initiated, and then to add the entirety or any remainder during the radically initiated emulsion polymerization, under polymerization conditions, as and when required, continuously or discontinuously, in the first and/or second polymerization stages. It is of course possible to use different dispersing assistants in different amounts in the first and second polymerization stages. With advantage, a portion (≤50 wt %) of the dispersing assistants is included in the initial reaction vessel charge, and the remaining amounts (≥50 wt %) are metered in continuously in the first and second polymerization stages.

In general, the amount of dispersing assistants in the first polymerization stage is ≥0.05 and ≤5.0 wt %, preferably ≥0.1 and ≤2.5 wt %, and more preferably ≥0.3 and ≤2.0 wt %, based in each case on the total monomer amount 1, and in the second polymerization stage the amount thereof is ≥0.05 and ≤1.0 wt %, preferably ≥0.1 and ≤0.7 wt %, and more preferably ≥0.1 and ≤0.5 wt %, based in each case on the total monomer amount 2.

It is important that the process of the invention is carried out in the first and/or second polymerization stages advantageously in the presence of an organic solvent having an evaporation number≥20, advantageously ≥25 and ≤500, and especially advantageously ≥30 and ≤200, determined according to DIN 53170 (2009 August). Suitable solvents include both water-soluble and water-insoluble organic solvents, such as, for example, aromatic hydrocarbons, such as solvent naphtha or mixtures of aromatic hydrocarbons, of the kind sold as Solvesso® 100, 150, or 200, for example, esters of low molecular mass carboxylic acids, such as methyl glycol acetate, ethyl glycol acetate, methoxypropyl acetate, 2,2,4-trimethyl-1,3-pentanediol monoisobutyrate (Texanol® from Eastman), dipropylene glycol monomethyl ether acetate, propylene glycol monoethyl ether acetate, propylene glycol monomethyl ether acetate, ethers such as butyl glycol, dioxane, ethyl glycol ether, diethylene glycol monoethyl ether, diethylene glycol monomethyl ether, diethylene glycol mono-n-butyl ether, diethylene glycol mono-n-hexyl ether, diethylene glycol diethyl ether, diethylene glycol dimethyl ether, diethylene glycol di-n-butyl ether, diethylene glycol di-n-hexyl ether, ethylene glycol di-2-ethylhexyl ether, ethylene glycol di-n-butyl ether, ethylene glycol di-n-hexyl ether, ethylene glycol di-n-propyl ether, dipropylene glycol dimethyl ether, dipropylene glycol monomethyl ether, dipropylene glycol mono-n-butyl ether, dipropylene glycol mono-n-propyl ether, dipropylene glycol mono-tert-butyl ether, dipropylene glycol di-tert-butyl ether, propylene glycol monoethyl ether, propylene glycol monomethyl ether, propylene glycol mono-n-propyl ether, propylene glycol monophenyl ether, propylene glycol mono-tert-butyl ether, propylene glycol diphenyl ether, propylene glycol mono-n-butyl ether, tripropylene glycol monomethyl ether, and poly(allyl glycidyl ether), ketones such as diisobutyl ketone, methyl isoamyl ketone, or ethyl amyl ketone, halogen-containing organic solvents such as methylene chloride or trichloromonofluoroethane, or other organic solvents, such as, for example, benzyl alcohol, dibutyl phthalate, propylene glycol and/or tris(butoxyethyl) phosphate, with particular suitability being possessed by butyl glycol, Solvesso® 100 and/or propylene glycol mono-n-butyl ether.

The total amount of organic solvent is ≤50 wt %, preferably ≥1.0 and ≤25 wt %, and especially preferably ≥5.0 and ≤20 wt %, based in each case on the total monomer amount.

In accordance with the invention it is possible to include the total amount of the organic solvent used in the initial charge in the aqueous reaction medium before the polymerization reaction is initiated. It is, however, also possible to include, optionally, only a portion of the organic solvent in the initial charge in the aqueous reaction medium before the polymerization reaction is initiated, and then, under polymerization conditions, during the radically initiated emulsion polymerization, to add the total amount or any remainder in the first and/or second polymerization stage, as required, continuously or discontinuously. In the first and in the second polymerization stages it is of course possible to use different organic solvents in different amounts. With advantage, the total amount of organic solvent is metered in divided between the first and second polymerization stages, under polymerization conditions, more particularly as a constituent of the monomer mixtures.

In general, the amount of organic solvent in the first polymerization stage is ≤50 wt %, preferably ≥1.0 and ≤25 wt %, and more preferably ≥5.0 and ≤20 wt %, based in each case on the total monomer amount 1, and in the second polymerization stage the amount is ≤50 wt %, preferably ≥1.0 and ≤25 wt %, and more preferably ≥5.0 and ≤20 wt %, based in each case on the total monomer amount 2.

The amount of monomers A1 used in the first polymerization stage is ≥0.5 and ≤15 wt %, the amount of monomers B1 is ≥5 and ≤40 wt %, the amount of monomers C1 is ≥0 and ≤40 wt %, preferably ≥8 and ≤30 wt %, and the amount of monomers D1 is ≥15 and ≤94.5 wt %, preferably ≥35 and ≤89 wt %, based in each case on the sum of the total amounts of monomers A1 to D1 (total monomer amount 1).

Used advantageously in the first polymerization stage are

≥1 and ≤12 wt % of acrylic acid, methacrylic acid, crotonic acid, fumaric acid, maleic acid, 2-methylmaleic acid and/or itaconic acid, ≥10 and ≤35 wt % of diethylene glycol monoacrylate, 4-hydroxybutyl acrylate, 3-hydroxypropyl acrylate, 2-hydroxypropyl acrylate, 2-hydroxyethyl acrylate, diethylene glycol monomethacrylate, 4-hydroxybutyl methacrylate, 3-hydroxypropyl methacrylate, 2-hydroxypropyl methacrylate and/or 2-hydroxyethyl methacrylate, ≥0-≤40 wt % preferably ≥8 and ≤30 wt %, of isobornyl methacrylate, isophoryl methacrylate and/or cyclohexyl methacrylate ≥35 and ≤89 wt % preferably ≥40 and ≤81 wt %, of 2-ethylhexyl acrylate, n-butyl methacrylate, n-butyl acrylate, styrene and/or methyl methacrylate, and more preferably ≥5 and ≤10 wt % of acrylic acid and/or methacrylic acid, ≥15 and ≤35 wt % of 2-hydroxyethyl acrylate and/or 2-hydroxyethyl methacrylate, ≥10-≤30 wt % of isobornyl methacrylate, and/or cyclohexyl methacrylate ≥45 and ≤70 wt % of 2-ethylhexyl acrylate, n-butyl acrylate, styrene and/or methyl methacrylate.

and the amounts of the monomers A1 to D1 adding up to 100 wt %.

It is essential to the invention that the amount of the chain transfer agent is selected such that the polymer 1 obtained from the first polymerization stage has a weight-average molecular weight in the range of ≥5000 and ≤40 000 g/mol, advantageously ≥7500 and ≤25 000 g/mol, and especially advantageously ≥9000 and ≤20 000 g/mol.

Unless otherwise indicated, the weight-average molecular weight Mw is determined in this specification generally by way of a size exclusion chromatography (SEC) using tetrahydrofuran as eluent and using internal polymer standards. The method and its implementation are familiar to the skilled person. The weight-average molecular weights are determined advantageously with tetrahydrofuran, comprising 0.1 wt % of trifluoroacetic acid, as eluent, with a flow rate of 1 ml/min and a column temperature of 35° C. The aqueous polymer dispersions are diluted in the eluent advantageously to a concentration of about 2 mg of polymer per ml, this solution is filtered on a 0.2 μm filter (Sartorius Minisart SRP 25) to remove any insoluble gel fraction, and 100 μl of the resultant filtered solution are injected. As columns, three columns having an internal diameter of 7.5 mm are combined as follows: 5 cm preliminary column (Plgel 10μ Guard preliminary column) followed by two 30 cm separating columns connected in series (each Plgel 10μ Mixed B). Detection takes place advantageously by means of an Agilent 1100 differential refractometer, Agilent 1100 VWD UV photometer, PSS SLD7000-BI-MwA (UV/254 nm/Agilent). The calibration is familiar to the skilled person and takes place using narrow-range polystyrene standards, for example from Polymer Laboratories, having molecular weights of Mw=580 to Mw=7 500 000, and also hexylbenzene (M=162).

In accordance with the invention, in the first polymerization stage, the nature and amounts of the monomers A1 to D1 are selected such that the resulting polymer 1 has a glass transition temperature $Tg^1$ as measured according to DIN EN ISO 11357-2 (2013 September) [differential thermal analysis, midpoint temperature, heating rate 20 K/min]≥15° C., advantageously in the range of ≥15 and ≤100° C., and especially advantageously ≥15 and ≤75° C. It is important in this context that the glass transition temperature $Tg^1$ is generally measured only on polymers 1 which have been prepared without the use of organic solvents.

Familiar to the skilled person is that, according to Fox (T. G. Fox, Bull. Am. Phys. Soc. 1956 [Ser. II] 1, page 123 and in accordance with Ullmann's Encyclopädie der technischen Chemie, vol. 19, page 18, 4th edition, Verlag Chemie, Weinheim, 1980), the glass transition temperature of copolymers with no more than low degrees of crosslinking can be estimated in good approximation using the following formula:

$$1/Tg=x_1/Tg^1+x_2/Tg^2+ \ldots x_n/Tg^n,$$

where $x_1$, $x_2$, . . . $x_n$ are the mass fractions of the monomers 1, 2, . . . n and $Tg^1$, $Tg^2$, . . . $Tg^n$ are the glass transition temperatures of the polymers constructed in each case only from one of the monomers 1, 2, . . . n, in degrees Kelvin. The glass transition temperatures of these homopolymers are known for the majority of ethylenically unsaturated monomers (and/or can be determined experimentally in an easy way known per se) and are listed in, for example, J. Brandrup, E. H. Immergut, Polymer Handbook 1st Ed. J. Wiley, New York, 1966, 2nd Ed. J. Wiley, New York, 1975, and 3rd Ed. J. Wiley, New York, 1989, and also in Ullmann's Encyclopedia of Industrial Chemistry, page 169, Verlag Chemie, Weinheim, 1992.

It is possible, that the radically initiated aqueous emulsion polymerization in the first polymerization stage may also be carried out in the presence of a polymer seed, as for example in the presence of 0.01 to 10 wt %, frequently of 0.05 to 7.0 wt %, and often of 0.1 to 4.0 wt % of a polymer seed, based in each case on the total monomer amount 1. Such a polymer seed might be prepared by in-situ polymerization or added as an exogenous polymer seed having a different monomer composition.

A polymer seed is employed in particular when the particle size of the polymer particles to be prepared by means of a radically initiated aqueous emulsion polymerization is to be set to a controlled size (in this regard, see, for example, U.S. Pat. Nos. 2,520,959 and 3,397,165).

The polymer seed is used customarily in the form of an aqueous polymer dispersion.

According a preferred embodiment the polymer is prepared by emulsion polymerization of a monomer composition 2 (monomers A2 to D2) in the presence of polymer 1 and wherein at least a part of the carboxylic acid groups employed in first polymerization stage and optionally in the second polymerization stage are neutralized during or following the stage 1 and/or 2 to form a fully or partially neutralized polymer emulsion. Preferably they are neutralized at the end of the first polymerization stage and before the second polymerization stage when at least 85 wt-% preferably at least 90 wt.-% especially at least 95 wt.-% of the total monomers A1 to D1 are reacted.

Neutralizers can be selected from mineral bases such as sodium hydroxide, potassium hydroxide, salts of phosphoric acid, organic amines such as, for example, alkyl hydroxylamine, and ammonia. Selection of a single neutralizer or combinations thereof generally depends on the desired balance between odor, e.g., potentially from high ammonia levels, VOC level, e.g. from a volatile organic amine, water sensitivity, scrub resistance, blocking resistance, etc. For example, water resistance of the coating can become compromised if too much permanent mineral base (such as sodium hydroxide) is present in the dried film. For the present invention preferred is ammonia or combinations of ammonia and organic amines for the application.

It is essential to the process that in the second polymerization stage, in the presence of the polymer 1, ≤1.0 wt % of at least one monomer A2, ≥0.1 and ≤40 wt % of at least one monomer B2, ≥0-≤40 wt % of monomer C2 and ≥30 and ≤99.9 wt % of at least one monomer D2, based in each case on the total monomer amount 2, are polymerized in the presence of at least one radical initiator and of at least one chain transfer agent, and also, optionally, in the presence of a dispersing assistant.

Used advantageously in the second polymerization stage are

≥0 and ≤0.5 wt % of acrylic acid, methacrylic acid, crotonic acid, fumaric acid, maleic acid, 2-methyl maleic acid and/or itaconic acid, ≥5 and ≤35 wt % of diethylene glycol monoacrylate, 4-hydroxybutyl acrylate, 3-hydroxypropyl acrylate, 2-hydroxypropyl acrylate, 2-hydroxyethyl acrylate, diethylene glycol monomethacrylate, 4-hydroxybutyl methacrylate, 3-hydroxypropyl methacrylate, 2-hydroxypropyl methacrylate and/or 2-hydroxyethyl methacrylate, ≥5-≤30 wt % of isobornyl methacrylate, isophoryl methacrylate and/or cyclohexyl methacrylate, ≥50 and ≤90 wt % of 2-ethylhexyl acrylate, n-butyl methacrylate, n-butyl acrylate, styrene and/or methyl methacrylate and more preferably ≥0 and ≤0.1 wt % of acrylic acid and/or methacrylic acid, ≥8 and ≤30 wt % of 2-hydroxyethyl acrylate and/or 2-hydroxyethyl methacrylate, ≥5-≤20 wt % of isobornyl methacrylate, and/or cyclohexyl methacrylate, ≥50 and ≤87 wt % of 2-ethylhexyl acrylate, n-butyl acrylate, styrene and/or methyl methacrylate.

and the amounts of the monomers A2 to D2 adding up to 100 wt %.

With advantage no monomers A2 at all are used in the second polymerization stage.

In the second polymerization stage, advantageously, the nature and amounts of the monomers A2 to D2 are selected such that a polymer 2 would have a calculated glass transition temperature Tg(cal) according Fox in the range≥0 and ≤75° C., advantageously ≥10 and ≤65° C., and especially advantageously ≥15 and ≤60° C.

Used with particular advantage are, in the first polymerization stage,

≥5 and ≤10 wt % of monomers A1,

≥15 and ≤35 wt % of monomers B1, and

≥10 and ≤30 wt % of monomers C1 and

≥45 and ≤70 wt % of monomers D1, and the amounts of the monomers A1 to D1 adding up to 100 wt % and, in the second polymerization stage,

≥0 and ≤0.1 wt % of monomers A2,

≥8 and ≤30 wt % of monomers B2,

≥5 and ≤20 wt % of monomers C2 and

≥50 and ≤87 wt % of monomers D2, and the amounts of the monomers A2 to D2 adding up to 100 wt %.

In accordance with the invention, the weight ratio of total monomer amount 1 to total monomer amount 2 is in the range 5:95 to 70:30, advantageously in the range 15:85 to 60:40, and especially advantageously in the range 20:80 to 50:50.

In accordance with the invention, the amount of chain transfer agent in the second polymerization stage is selected such that the overall polymer obtained after the second polymerization stage has a weight-average molecular weight≤75 000 g/mol, advantageously ≥10 000 and ≤60 000 g/mol, and especially advantageously ≥15 000 and ≤50 000 g/mol.

It is essential to the process, however, that the amount of optionally employed dispersing assistants is ≤3 wt %, advantageously≤1 wt %, and especially advantageously ≥0.3 and ≤0.7 wt %, based in each case on total monomer amount.

With advantage, the monomers of the first and second polymerization stages are selected such that the glass transition temperature $Tg^1$(cal) (calculated according Fox) of the polymer 1 is at least 20° C. above the glass transition temperature $Tg^2$(cal) (calculated according Fox) of the polymer 2; i.e., the difference $Tg^1$(cal)−$Tg^2$(cal) is ≥20° C. With advantage, the difference $Tg^1$(cal)−$Tg^2$(cal) is ≥30° C., and with particular advantage it is ≥35° C.

The aqueous polymer dispersion obtained after the second polymerization stage comprises polymer particles whose weight-average particle diameter is in the range≥50 and ≤250 nm, advantageously in the range≥60 and ≤200 nm, and more particularly in the range≥80 and ≤200 nm. The determination of the weight-average particle diameters is made in accordance with the invention according to ISO 13321 using a High Performance Particle Sizer from Malvern at 22° C. and a wavelength of 633 nm.

In general, the aqueous polymer dispersions obtainable by the process of the invention have a solids content in the range of ≥35 and ≤70 wt % and advantageously ≥40 and ≤55 wt %, based in each case on the aqueous polymer dispersion. The solids content here is determined by drying an aliquot amount (around 1 g) of the aqueous polymer dispersion to constant weight at a temperature of 120° C. in an aluminum dish having an internal diameter of around 5 cm.

In one embodiment of the present invention, the intention is to comprise the aqueous polymer dispersions obtainable by the process of the invention.

With advantage, the aqueous polymer dispersions accessible in accordance with the process of the invention are suitable for use as binders in the production of coatings, adhesives, sealants, synthetic resin renders, papercoating slips, nonwoven fiber webs, flexible roof coatings, and industrial and architectural coatings, and also in sand consolidation, as a component in the production of textile assistants or leather assistants, and impact modifier, or for the modification of mineral binders and plastics.

Where the aqueous polymer dispersions of the invention are used for producing coating compositions, such coating compositions shall for the purposes of the present specification be taken to include essentially adhesives, sealants, synthetic resin renders, papercoating slips, or paints and varnishes, and the aqueous polymer dispersions in this case are selected such that their minimum film-forming temperature (MFFT) is advantageously≤15° C., preferably ≤10° C., and especially preferably ≤5° C. Nevertheless, the resulting polymer films are not tacky.

The minimum film-forming temperature is determined by drawing down the aqueous polymer dispersion onto a plate which is heated at one end and cooled at the other (DIN ISO 2115: 2001 April). The minimum film-forming temperature can be determined by visual evaluation and by temperature sensors at close intervals along the plate.

Where the aqueous polymer dispersions prepared by the two-stage aqueous emulsion polymerization have polymers which comprise ethylenically unsaturated monomers having keto, aldehyde and/or acetoacetoxy carbonyl groups in copolymerized form, it may be of advantage if additionally a crosslinking agent is admixed to the aqueous polymer dispersion or to the aqueous coating composition produced therewith. In that case the crosslinking agent may be an organic compound having two or more primary amino groups, such as isophoronediamine or 4,7-dioxadecane-[1,10]-diamine, for example, or an organic compound having two or more hydrazide groups, such as adipic dihydrazide (ADDH), oxalic dihydrazide, phthalic dihydrazide, or terephthalic dihydrazide, for example.

The present aqueous polymer dispersions are notable for high stability and minimal formation of coagulum. According to the invention the polymer dispersions can be produced without dispersing assistant, or with only a small amount of dispersing assistant.

The aqueous polymer dispersions of the invention can also be used as binders for two-component coating compositions. The two-component coating compositions and coating formulations obtained are suitable for coating substrates such as wood, wood veneer, paper, cardboard, paperboard, textile, film, leather, nonwoven, plastics surfaces, glass, ceramic, mineral building materials, such as molded cement blocks and fiber-cement slabs, or metals, which in each case may optionally have been precoated or pretreated.

Coating compositions of this kind are suitable as or in interior or exterior coatings, i.e., in those applications where there is exposure to daylight, preferably of parts of buildings, coatings on (large) vehicles and aircraft, and industrial applications, utility vehicles in agriculture and construction, decorative coatings, bridges, buildings, power masts, tanks, containers, pipelines, power stations, chemical plants, ships, cranes, posts, sheet piling, valves, pipes, fittings, flanges, couplings, halls, roofs, and structural steel, furniture, kitchen, kitchen parts, flooring (e.g. parquet), windows, doors, can coating and coil coating, for floor coverings, such as in parking levels or in hospitals and in particular in automotive finishes, as OEM and refinish application.

Coating compositions of this kind are used preferably at temperatures from ambient temperature to 80° C., preferably from 5° C. to 60° C., more preferably from 10° C. to 40° C. The articles in question are preferably those which cannot be cured at high temperatures, such as large machines, aircraft, large-capacity vehicles, and refinish applications.

In particular the coating compositions of the invention are used as clearcoat, basecoat, and topcoat material(s), primers, and surfacers.

Suitable auxiliaries may be added for the various uses, such as, for example, flow control agents, thickeners, defoamers, fillers, pigments, pigment dispersing assistants, etc.

The coatings may be obtained by applying the coating compositions to suitable substrates, such as wood, concrete, metal, glass, plastic, ceramics, plasters, stone, asphalt, textiles, and coated, primed, or weathered substrates.

With two-component coating compositions, besides the aqueous polymer dispersion of the invention, a further, crosslinker component is required, which advantageously comprises polyisocyanates, melamine-formaldehyde resins and/or urea-formaldehyde resins, all known for these purposes to the skilled person.

Also comprised in accordance with the invention, therefore, are aqueous formulations which in addition to the aqueous polymer dispersion of the invention further comprise at least one component selected from the group comprising polyisocyanate, melamine-formaldehyde resin, and urea-formaldehyde resin.

The polyisocyanates which can be used in the two-component coating compositions of the invention are prepared by polymerization of monomeric aromatic, aliphatic and/or cycloaliphatic isocyanates, preferably of aliphatic and/or cycloaliphatic (in this specification, in abbreviated form, (cyclo)aliphatic) isocyanates, and more preferably of aliphatic isocyanates.

Aromatic isocyanates are those which comprise at least one aromatic ring system, in other words not only purely aromatic compounds but also araliphatic compounds. The former are isocyanates where the isocyanato groups are attached directly to aromatic ring systems, whereas in the case of the latter the isocyanato groups are attached to alkylene groups, but the compounds also comprise aromatic ring systems, as in the case of TMXDI, for example.

Cycloaliphatic isocyanates are those which comprise at least one cycloaliphatic ring system.

Aliphatic isocyanates are those which comprise exclusively linear or branched carbon chains, i.e., acyclic compounds.

The monomeric isocyanates are preferably diisocyanates, which carry precisely two isocyanate groups. They can, however, in principle also be monoisocyanates, having one isocyanate group.

In principle, higher isocyanates having on average more than 2 isocyanate groups are also contemplated. Suitability therefor is possessed for example by triisocyanates such as triisocyanatononane, 2'-isocyanatoethyl 2,6-diisocyanatohexanoate, 2,4,6-triisocyanatotoluene, triphenylmethane triisocyanate or 2,4,4'-triisocyanatodiphenyl ether, or the mixtures of diisocyanates, triisocyanates, and higher polyisocyanates that are obtained, for example, by phosgenation of corresponding aniline/formaldehyde condensates and represent methylene-bridged polyphenyl polyisocyanates.

These monomeric isocyanates do not contain any substantial products of reaction of the isocyanate groups with themselves.

The monomeric isocyanates are preferably isocyanates having 4 to 20 C atoms. Examples of typical diisocyanates are aliphatic diisocyanates such as tetramethylene diisocyanate, pentamethylene 1,5-diisocyanate, hexamethylene diisocyanate (1,6-diisocyanatohexane), octamethylene diisocyanate, decamethylene diisocyanate, dodecamethylene diisocyanate, tetradecamethylene diisocyanate, derivatives of lysine diisocyanate (e.g., methyl 2,6-diisocyanatohexanoate or ethyl 2,6-diisocyanatohexanoate), trimethylhexane diisocyanate or tetramethylhexane diisocyanate, cycloaliphatic diisocyanates such as 1,4-, 1,3- or 1,2-diisocyanatocyclohexane, 4,4'- or 2,4'-di(isocyanatocyclohexyl)methane, 1-isocyanato-3,3,5-trimethyl-5-(isocyanatomethyl)cyclohexane (isophorone diisocyanate), 1,3- or 1,4-bis(isocyanatomethyl)cyclohexane or 2,4- or 2,6-diisocyanato-1-methylcyclohexane, and also 3 (or 4), 8 (or 9)-bis(isocyanatomethyl)tricyclo[5.2.1.$0^{2,6}$]decane isomer mixtures, and also aromatic diisocyanates such as tolylene 2,4- or 2,6-diisocyanate and the isomer mixtures thereof, m- or p-xylylene diisocyanate, 2,4'- or 4,4'-diisocyanatodiphenylmethane and the isomer mixtures thereof, phenylene 1,3- or 1,4-diisocyanate, 1-chlorophenylene 2,4-diisocyanate, naphthylene 1,5-diisocyanate, diphenylene 4,4'-diisocyanate, 4,4'-diisocyanato-3,3'-dimethylbiphenyl, 3-methyldiphenylmethane 4,4'-diisocyanate, tetramethylxylylene diisocyanate, 1,4-diisocyanatobenzene or diphenyl ether 4,4'-diisocyanate.

Particular preference is given to hexamethylene 1,6-diisocyanate, 1,3-bis(isocyanatomethyl)cyclohexane, isophorone diisocyanate, and 4,4'- or 2,4'-di(isocyanatocyclohexyl)methane, very particular preference to isophorone diisocyanate and hexamethylene 1,6-diisocyanate, and especial preference to hexamethylene 1,6-diisocyanate.

Mixtures of said isocyanates may also be present.

Isophorone diisocyanate is usually in the form of a mixture, specifically a mixture of the cis and trans isomers, generally in a proportion of about 60:40 to 90:10 (w/w), preferably of 70:30 to 90:10.

Dicyclohexylmethane 4,4'-diisocyanate may likewise be in the form of a mixture of the different cis and trans isomers.

As diisocyanates it is possible to use not only those diisocyanates obtained by phosgenating the corresponding amines but also those prepared without the use of phosgene, i.e., by phosgene-free processes. According to EP-A-126 299 (U.S. Pat. No. 4,596,678), EP-A-126 300 (U.S. Pat. No. 4,596,679), and EP-A-355 443 (U.S. Pat. No. 5,087,739), for example, (cyclo)aliphatic diisocyanates, such as hexamethylene 1,6-diisocyanate (HDI), isomeric aliphatic diisocyanates having 6 carbon atoms in the alkylene radical, 4,4'- or 2,4'-di(isocyanatocyclohexyl)methane, and 1-isocyanato-3-isocyanatomethyl-3,5,5-trimethylcyclohexane (isophorone diisocyanate or IPDI), for example, can be prepared by reacting the (cyclo)aliphatic diamines with, for example, urea and alcohols to give (cyclo)aliphatic biscarbamic esters and subjecting said esters to thermal cleavage into the corresponding diisocyanates and alcohols. The synthesis takes place usually continuously in a circulation process and optionally in the presence of N-unsubstituted carbamic esters, dialkyl carbonates, and other by-products recycled from the reaction process. Diisocyanates obtained in this way generally contain a very low or even unmeasurable fraction of chlorinated compounds, which is advantageous, for example, in applications in the electronics industry.

In one embodiment of the present invention the isocyanates used have a total hydrolyzable chlorine content of less than 200 ppm, preferably of less than 120 ppm, more preferably less than 80 ppm, very preferably less than 50 ppm, in particular less than 15 ppm, and especially less than 10 ppm. This can be measured by means, for example, of ASTM specification D4663-98. Of course, though, monomeric isocyanates having a higher chlorine content can also be used, of up to 500 ppm, for example.

It will be appreciated that it is also possible to employ mixtures of those monomeric isocyanates which have been obtained by reacting the (cyclo)aliphatic diamines with, for example, urea and alcohols and cleaving the resulting (cyclo)aliphatic biscarbamic esters, with those diisocyanates which have been obtained by phosgenating the corresponding amines.

The polyisocyanates which can be formed by oligomerizing the monomeric isocyanates are generally characterized as follows:

The average NCO functionality of such compounds is in general at least 1.8 and can be up to 8, preferably 2 to 5, and more preferably 2.4 to 4.

The isocyanate group content after oligomerization, calculated as NCO=42 g/mol, is generally from 5% to 25% by weight unless otherwise specified.

The polyisocyanates are preferably compounds as follows:

1) Polyisocyanates containing isocyanurate groups and derived from aromatic, aliphatic and/or cycloaliphatic diisocyanates. Particular preference is given in this context to the corresponding aliphatic and/or cycloaliphatic isocyanatoisocyanurates and in particular to those based on hexamethylene diisocyanate and isophorone diisocyanate. The isocyanurates present are, in particular, trisisocyanatoalkyl and/or trisisocyanatocycloalkyl isocyanurates, which constitute cyclic trimers of the diisocyanates, or are mixtures with their higher homologs containing more than one isocyanurate ring. The isocyanatoisocyanurates generally have an NCO content of 10% to 30% by weight, in particular 15% to 25% by weight, and an average NCO functionality of 2.6 to 8. The polyisocyanates containing isocyanurate groups may to a minor extent also comprise urethane groups and/or allophanate groups, preferably with a bound-alcohol content of less than 2% by weight, based on the polyisocyanate.
2) Polyisocyanates containing uretdione groups and having aromatically, aliphatically and/or cycloaliphatically attached isocyanate groups, preferably aliphatically and/or cycloaliphatically attached, and in particular those derived from hexamethylene diisocyanate or isophorone diisocyanate. Uretdione diisocyanates are cyclic dimerization products of diisocyanates.
   The polyisocyanates containing uretdione groups are obtained frequently in a mixture with other polyisocyanates, more particularly those specified under 1). Polyisocyanates containing uretdione groups typically have functionalities of 2 to 3.
   For this purpose the diisocyanates can be reacted under reaction conditions under which not only uretdione groups but also the other polyisocyanates are formed, or the uretdione groups are formed first of all and are subsequently reacted to give the other polyisocyanates, or the diisocyanates are first reacted to give the other polyisocyanates, which are subsequently reacted to give products containing uretdione groups.
3) Polyisocyanates containing biuret groups and having aromatically, cycloaliphatically or aliphatically attached, preferably cycloaliphatically or aliphatically attached, isocyanate groups, especially tris(6-isocyanatohexyl)biuret or its mixtures with its higher homologs. These polyisocyanates containing biuret groups generally have an NCO content of 18% to 24% by weight and an average NCO functionality of 2.8 to 6.
4) Polyisocyanates containing urethane groups and/or allophanate groups and having aromatically, aliphatically or cycloaliphatically attached, preferably aliphatically or cycloaliphatically attached, isocyanate groups, of the kind, which for example, are obtained by reaction of excess amounts of diisocyanate, such as of hexamethylene diisocyanate or of isophorone diisocyanate, with mono- or polyhydric alcohols. These polyisocyanates containing urethane groups and/or allophanate groups generally have an NCO content of 12% to 24% by weight and an average NCO functionality of 2.0 to 4.5.
   Polyisocyanates of this kind containing urethane groups and/or allophanate groups may be prepared without catalyst or, preferably, in the presence of catalysts, such as ammonium carboxylates or ammonium hydroxides, for example, or allophanatization catalysts, such as bismuth, cobalt, cesium, Zn(II) or Zr(IV) compounds, for example, in each case in the presence of monohydric, dihydric or polyhydric, preferably monohydric, alcohols.
   These polyisocyanates containing urethane groups and/or allophanate groups occur frequently in hybrid forms with the polyisocyanates specified under 1).
5) Polyisocyanates comprising oxadiazinetrione groups, derived preferably from hexamethylene diisocyanate or isophorone diisocyanate. Polyisocyanates of this kind comprising oxadiazinetrione groups are accessible from diisocyanate and carbon dioxide.
6) Polyisocyanates comprising iminooxadiazinedione groups, derived preferably from hexamethylene diisocyanate or isophorone diisocyanate. Polyisocyanates of this kind comprising iminooxadiazinedione groups are preparable from diisocyanates by means of specific catalysts.

7) Uretonimine-modified polyisocyanates.

8) Carbodiimide-modified polyisocyanates.

9) Hyperbranched polyisocyanates, of the kind known for example from DE-A 10013186 or DE-A 10013187.

10) Polyurethane-polyisocyanate prepolymers, from di- and/or polyisocyanates with alcohols.

11) Polyurea-polyisocyanate prepolymers.

12) The polyisocyanates 1)-11), preferably 1), 3), 4), and 6), described under the abovementioned points, can be converted, following their preparation, into polyisocyanates containing biuret groups or urethane/allophanate groups and having aromatically, cycloaliphatically or aliphatically attached, preferably (cyclo)aliphatically attached, isocyanate groups. The formation of biuret groups, for example, is accomplished by addition of water or by reaction with amines. The formation of urethane groups and/or allophanate groups is accomplished by reaction with monohydric, dihydric or polyhydric, preferably monohydric, alcohols, in the presence optionally of suitable catalysts. These polyisocyanates containing biuret groups or urethane/allophanate groups generally have an NCO content of 10% to 25% by weight and an average NCO functionality of 3 to 8.

13) Hydrophilically modified polyisocyanates, i.e., polyisocyanates which as well as the groups described under 1) to 12) also comprise groups which result formally from addition of molecules containing NCO-reactive groups and hydrophilizing groups to the isocyanate groups of the above molecules. The latter groups are nonionic groups such as alkylpoly-ethylene oxide and/or ionic groups derived from phosphoric acid, phosphonic acid, sulfuric acid or sulfonic acid, and/or their salts.

14) Modified polyisocyanates for dual cure applications, i.e., polyisocyanates which as well as the groups described under 1) to 13) also comprise groups resulting formally from addition of molecules containing NCO-reactive groups and UV-crosslinkable or actinic-radiation-crosslinkable groups to the isocyanate groups of the above molecules. These molecules are, for example, hydroxyalkyl (meth)acrylates and other hydroxy-vinyl compounds.

In one preferred embodiment of the present invention, the polyisocyanates are hydrophilically modified polyisocyanates or mixtures of hydrophilically modified and nonmodified polyisocyanates.

In one particularly preferred embodiment, the polyisocyanate comprises polyisocyanates based on 1,6-hexamethylene diisocyanate.

In one further particularly preferred embodiment, the polyisocyanate comprises a mixture of polyisocyanates, very preferably of 1,6-hexamethylene diisocyanate and of isophorone diisocyanate.

In one particularly preferred embodiment, the polyisocyanate is a mixture comprising low-viscosity polyisocyanates, preferably polyisocyanates comprising isocyanurate groups, having a viscosity of 600 to 1500 mPa*s, more particularly below 1200 mPa*s, low-viscosity urethanes and/or allophanates having a viscosity of 200 to 1600 mPa*s, more particularly 600 to 1500 mPa*s, and/or polyisocyanates comprising iminooxadiazinedione groups.

In this specification, unless noted otherwise, the viscosities reported are determined at 23° C. in accordance with DIN EN ISO 3219/A.3 in a cone/plate system with a shear rate of 1000 $s^{-1}$.

The process for preparing the polyisocyanates may take place as described in WO 2008/68198, especially from page 20 line 21 to page 27 line 15 therein, which is hereby made part of the present specification by reference.

The reaction can be discontinued, for example, as described therein from page 31 line 19 to page 31 line 31, and working up may take place as described therein from page 31 line 33 to page 32 line 40, which in each case is hereby made part of the present specification by reference.

The reaction can alternatively also be discontinued as described in WO 2005/087828 from page 11 line 12 to page 12 line 5, which is hereby made part of the present specification by reference.

In the case of thermally labile catalysts it is also possible, furthermore, to discontinue the reaction by heating the reaction mixture to a temperature above at least 80° C., preferably at least 100° C., more preferably at least 120° C. Generally, it is sufficient for this purpose to heat the reaction mixture, in the way which is necessary at the working-up stage in order to separate the unreacted isocyanate by distillation.

In the case both of thermally non-labile catalysts and of thermally labile catalysts, the possibility exists of terminating the reaction at relatively low temperatures by addition of deactivators. Examples of suitable deactivators are hydrogen chloride, phosphoric acid, organic phosphates, such as dibutyl phosphate or diethylhexyl phosphate, carbamates such as hydroxyalkyl carbamate, or organic carboxylic acids.

These compounds are added neat or diluted in a suitable concentration as necessary to discontinue the reaction.

As a second component in two-component coating compositions, it is also possible to use melamine-formaldehyde resins and urea-formaldehyde resins.

Melamine-formaldehyde resins can be characterized according to fields of application (molding compounds, glues, impregnating resins, coating compositions), alkylating compounds (etherification with butanol, methanol, mixed etherification) or, as listed here, according to the ratio of triazine to formaldehyde to etherifying alcohol:

1. fully to highly methylolated and fully alkylated to highly alkylated resins (HMMM grades)

2.1 partly methylolated and highly alkylated resins (high imino grades)

2.2. partly methylolated and partly alkylated resins (methylol grades)

3. resins with a low degree of methylolation (melamine-formaldehyde condensates)

The first major group, that of the fully etherified melamine-formaldehyde resins, in which the so-called molar melamine:formaldehyde:alcohol incorporation ratio is theoretically 1:6:6, in practice generally 1:>5.5:>5.0, and usually 1:>5.5:>4.5, is distinguished by extremely good high-solids behavior (relatively low viscosity at high solids content). In this group of crosslinkers, the free formaldehyde is readily reducible, owing to the low viscosity of the amino resin. At the present time it is possible to achieve a free formaldehyde content of <0.3% by weight. The commercial products usually comprise methanol as the alcohol, although grades with mixed etherification, or fully butylated grades, are also known.

The fully etherified melamine-formaldehyde resins are employed in practice preferably in can coatings and coil coatings worldwide, and in NAFTA also for all coats of the automotive coat system.

The low thermal reactivity under baking conditions, such as 20 minutes at 140° C., necessitates catalysis with strong acids for these fully etherified melamine-formaldehyde resins. This results in very rapid curing, and a homogeneous co-network as a result of transetherification with the binder, accompanied by the release of the etherifying alcohols. With this strong-acid catalysis, very short cure times are possible, as with partly methylolated melamine-formaldehyde resins. Crosslinking may be accompanied by formaldehyde emission which goes well beyond the free formaldehyde and is due to the redissociation of methylol groups.

The second major group, that of the partly etherified melamine-formaldehyde resins, which in practice usually show a molar melamine:formaldehyde:alcohol incorporation ratio of 1:3 to 5.4:2 to 4.3, is distinguished by a much higher thermal reactivity than that of the first group, without acid catalysis. The production of these crosslinkers is accompanied by self-condensation, which leads to a higher viscosity (lower high-solids behavior) and so makes it more difficult to remove the free formaldehyde at distillation. For these products, a free formaldehyde content of 0.5% to 1.5% by weight is standard, although there are also products having a free formaldehyde content of 0.3% to 3% by weight. Here again, methylated and butylated grades and also grades with mixed etherification are widely encountered as commercial products. Etherification with further alkylating substances is described in the literature and available in the form of specialty products.

High-imino grades and methylol grades, each as a subgroup, both feature incomplete methylolation, i.e., molar formaldehyde incorporation ratios of less than 1:5.5. The high-imino grades differ from the methylol grades, however, in a high degree of alkylation, i.e., the fraction of etherified methylol groups as a proportion of the formaldehyde equivalents incorporated, of usually up to 80% by weight, whereas the figure for the methylol grades is generally <70% by weight.

Applications for the partly methylolated melamine-formaldehyde resins extend across all fields of use, including combinations with HMMM grades, for adaptation of reactivity, where curing temperatures of 100 to 150° C. are called for. Additional catalysis using weak acids is possible and is common practice.

Besides the reaction of the melamine-formaldehyde resins with the two-stage polymer of the aqueous polymer dispersion of the invention, there is a substantially increased proportion of self-crosslinking on the part of the melamine-formaldehyde resin with itself. The consequence is a reduced elasticity in the system as a whole, and this must be compensated by appropriate selection of the co-component. Set against this is the advantage of reduced total formaldehyde emission from the coatings produced from the system.

The structure of the melamine-formaldehyde resins which can be employed in accordance with the invention is advantageously as follows:

As mentioned earlier, melamine-formaldehyde resins are frequently characterized by way of the molar melamine: formaldehyde:alcohol incorporation ratio. The alcohol here is preferably selected from the group consisting of methanol, ethanol, isobutanol and n-butanol or mixtures thereof, and more preferably selected from the group consisting of methanol and n-butanol.

Melamine-formaldehyde resins which can be used in accordance with the invention may have a molar incorporation ratio of 1:(2 to 6):(1 to 6), though in individual cases, as a result of the formation of oligoformal chains, the formaldehyde incorporation ratio may even be up to 8.

Preferred molar incorporation ratios are 1:(3 to 6):(1.5 to 6).

For methyl-etherified melamine-formaldehyde resins, molar incorporation ratios of 1:(3.6 to 5.7):(2.1 to 4.7) are particularly preferred; very much preferred are molar incorporation ratios of 1:(5 to 6):(3.5 to 6), more particularly 1:(5 to 6):(4 to 5).

For n-butyl-etherified melamine-formaldehyde resins, molar incorporation ratios of 1:(3.2 to 5.7):(1.3 to 4) are particularly preferred; very much preferred are molar incorporation ratios of 1:(5 to 6):(3.5 to 6), more particularly 1:(5 to 6):(3.5 to 4.5).

The melamine-formaldehyde resins that can be used may have not only one melamine group per polycondensate but, indeed, two or more melamine groups, preferably up to six, more preferably up to four, very preferably up to three, and more particularly up to two.

The structure of urea-formaldehyde resins which can be used in accordance with the invention is advantageously as follows:

The molar urea:formaldehyde:alcohol incorporation ratio is 1:(1 to 4):(0.3 to 3), preferably 1:(1 to 3):(0.4 to 2), more preferably 1:(1.5 to 2.5):(0.5 to 1.5), and very preferably 1:(1.6 to 2.1):(0.6 to 1.3).

The alcohol here is preferably selected from the group consisting of methanol, ethanol, isobutanol, and n-butanol or mixtures thereof, more preferably selected from the group consisting of methanol and n-butanol.

The aqueous formulation of the invention, comprising the aqueous polymer dispersion of the invention and at least one component selected from the group comprising polyisocyanate, melamine-formaldehyde resin and urea-formaldehyde resin, is especially suitable in one particular embodiment as a binder for paints and as a binder for varnishes.

Where the aforementioned aqueous formulations are used for producing varnishes and paints, these aqueous formulations may further comprise pigments, fillers and/or anticorrosion agents.

Pigments used in this case may in principle be all organic and/or inorganic white and/or chromatic pigments familiar to the skilled person, with a particle size≤18 mesh.

The most important white pigment on the basis of its high refractive index (rutile: 2.70 and anatase: 2.55) and its high hiding power, is titanium dioxide in its various modifications. However, both zinc oxide and zinc sulfide as well are used as white pigments. These white pigments may be employed in surface-coated form or uncoated form. In addition, however, organic white pigments are used as well, such as nonfilming, hollow polymer particles rich in styrene and carboxyl groups, having a particle size of about 300 to 400 nm (referred to as opaque particles).

In addition to white pigments, for color design, any of a very wide variety of chromatic pigments comprise to the skilled person may be used, examples being the somewhat more reasonably priced inorganic iron, cadmium, chromium and lead oxides and/or sulfides, lead molybdate, cobalt blue or carbon black, and also the somewhat more expensive organic pigments, examples being phthalocyanines, azo pigments, quinacridones, perylenes or carbazoles.

It will be appreciated that the aqueous formulations may, in addition to the pigments, also comprise what are called fillers, familiar to the skilled person. Fillers are essentially inorganic materials in powder form, having a particle size≤18 mesh, with a refractive index lower than that of the pigments (white fillers, according to DIN 55943 and DIN 55945, have refractive index values<1.7). The fillers in powder form are often naturally occurring minerals, such as calcite, chalk, dolomite, kaolin, talc, mica, diatomaceous earth, barytes, quartz or talc/chlorite intergrowths, for example, or else synthetically produced inorganic compounds, such as precipitated calcium carbonate, calcined kaolin or barium sulfate, and fumed silica, for example. A preferred filler used is calcium carbonate, in the form of the crystalline calcite or of the amorphous chalk.

Anticorrosion agents contemplated include, in accordance with the invention, corrosion inhibitors or anticorrosion pigments, in particular.

The application of the aqueous formulation, especially aqueous coating compositions, especially advantageously paints and varnishes, to a substrate may take place in a known way, as for example by spraying, trowling, knife-coating, brushing, rolling, roller coating, or pouring. The coating thickness is generally in a range from about 3 to 1000 $g/m^2$, and preferably 10 to 200 $g/m^2$. The volatile constituents of the aqueous formulation are removed subsequently by drying. This operation may if desired be repeated one or more times.

Drying is familiar to the skilled person and takes place for example in a tunnel oven or by flashing. Drying may also take place by means of NIR radiation, with NIR radiation here referring to electromagnetic radiation in the wavelength range from 760 nm to 2.5 μm, preferably from 900 to 1500 nm. Drying may take place at a temperature from ambient temperature to 100° C. over a period of a few minutes to several days.

The two-component coating compositions and coating formulations obtained are suitable for coating substrates such as wood, wood veneer, paper, cardboard, paperboard, textile, film, leather, nonwoven, plastics surfaces, glass, ceramic, mineral building materials, such as molded cement blocks and fiber-cement slabs, or metals, which in each case may optionally have been precoated or pretreated.

Coating compositions of this kind are suitable as or in interior or exterior coatings, i.e., in those applications where there is exposure to daylight, preferably of parts of buildings, coatings on (large) vehicles and aircraft, and industrial applications, utility vehicles in agriculture and construction, decorative coatings, bridges, buildings, power masts, tanks, containers, pipelines, power stations, chemical plants, ships, cranes, posts, sheet piling, valves, pipes, fittings, flanges, couplings, halls, roofs, and structural steel, furniture, windows, doors, woodblock flooring, can coating and coil coating, for floor coverings, such as in parking levels or in hospitals and in particular in automotive finishes, as OEM and refinish application.

The curing method is guided by the nature of the crosslinker and takes place as a general rule under atmospheric conditions.

The temperature needed for curing is guided in particular by the crosslinker employed. Highly reactive crosslinkers can be cured at lower temperatures than less reactive crosslinkers.

In a further embodiment, the aqueous polymer dispersions and aqueous formulations of the invention may be used in clearcoats and in so-called direct-to-metal coatings; in the case of the clearcoat materials, in general no pigments and no anticorrosion agents are used. Clearcoat materials are applied as a single coat to the metal and find application especially when chemical resistance or gloss is required in addition to a corrosion control effect. It will be appreciated that the polymer dispersions and aqueous formulations of the invention can also be used in what are called topcoat materials. These topcoat materials, however, generally comprise pigments. For clearcoat and topcoat materials, typical dry film thicknesses are 15 to 200 μm, preferably 20 to 100 μm, and more preferably 20 to 80 μm.

The aqueous formulations of the invention applied to a substrate, and paints or varnishes based thereon, are baked at a temperature between room temperature and 200° C., preferably 100 to 150° C., over a period from 1 minute to 40 minutes, preferably 10 to 25 minutes.

The present invention further provides coating compositions comprising

- at least one aqueous polymer dispersion of the invention as binder,
- optionally at least one other binder, different from the aqueous polymer dispersion of the invention,
- at least one crosslinker selected from the group consisting of polyisocyanates, melamine-formaldehyde resins, and urea-formaldehyde resins,
- optionally at least one pigment, and
- optionally at least one corrosion inhibitor.

The optionally employed other binders different from the aqueous polymer dispersions of the invention may be, for example, water-based, water-dilutable, water-miscible polyacrylate polyols, polyester polyols, polyether polyols, polyurethane polyols; polyurea polyols; polyester polyacrylate polyols; polyester polyurethane polyols; polyurethane polyacrylate polyols, polyurethane-modified alkyd resins; fatty acid modified polyester polyurethane polyols, copolymers with allyl ethers, graft polymers of the stated groups of substances with, for example, different glass transition temperatures, and also mixtures of the stated binders. Preferred are polyacrylate polyols, polyester polyols, and polyurethane polyols.

Preferred hydroxyl numbers of these other binders, measured in accordance with DIN 53240-2 (by potentiometry), are 40 to 350 mg KOH/g and preferably 80 to 180 mg KOH/g resin solids for polyester polyols, and 15 to 250 mg KOH/g and preferably 80 to 160 mg KOH/g resin solids for polyacrylate polyols, and also 10 to 150 mg KOH/g and preferably 20 to 100 mg KOH/g resin solids for polyurethane polyols.

These other binders may additionally have an acid number in accordance with DIN EN ISO 3682 (by potentiometry) of up to 200 mg KOH/g, preferably up to 150 and more preferably up to 100 mg KOH/g binder.

Particularly preferred other binders are polyacrylate polyols and polyesterols.

Polyacrylate polyols preferably have a number-average molecular weight $M_n$ of at least 500 g/mol, more preferably at least 1200 g/mol. The molecular weight $M_n$ may in principle have no upper limit, or be preferably up to 50 000 g/mol, more preferably up to 20 000 g/mol, very preferably up to 10 000 g/mol, and more particularly up to 5000 g/mol.

The number-average molecular weights are determined by gel permeation chromatography, which is familiar to the skilled person, using suitable calibration compounds.

Further other binders are, for example, polyester polyols of the kind obtainable by condensing polycarboxylic acids, more particularly dicarboxylic acids, with polyols, more particularly diols. In order to ensure that the polyester polyol has a functionality appropriate for the polymerization use is also made in part of triols, tetrols, etc., and of tribasic acids, etc.

Polyester polyols are known for example from Ullmann's Enzyklopädie der technischen Chemie, 4th edition, volume 19, pages 62 to 65. It is preferred to use polyester polyols obtained by reacting dihydric alcohols with dibasic carboxylic acids. In place of the free polycarboxylic acids it is also possible to use the corresponding polycarboxylic anhydrides or corresponding polycarboxylic esters of lower alcohols or mixtures thereof to prepare the polyester polyols. The polycarboxylic acids may be aliphatic, cycloaliphatic, aromatic or heterocyclic and may optionally be substituted, by halogen atoms, for example, and/or unsaturated.

Coating compositions prepared with the inventive polymer dispersions show a acceptable gloss characteristics and a relatively low haze and have good drying times for a wide range of drying tests, especially on cotton wool. The coatings show faster drying and/or hardness development and still have a sufficient gloss.

The invention is to be illustrated using the following, nonlimiting examples.

Abbreviations

CHMA cyclohexyl methacrylate
DMEA dimethylethanolamine
IBOMA isobornyl methacrylate
IPhMA isophoryl methacrylate
HDI hexamethylene diisocyanate
IPDI isophorone diisocyanate
Mw weight-average molecular weight
pphm parts per hundred monomers
Tg glass transition temperature Weight-Average Molecular Weight for First Stage and Final Polymer Unless otherwise indicated, the weight-average molecular weight Mw is determined in this specification generally by way of a size exclusion chromatography (SEC) using tetrahydrofuran as eluent and using internal polymer standards. The method and its implementation are familiar to the skilled person. The weight-average molecular weights are determined advantageously with tetrahydrofuran, comprising 0.1 wt % of trifluoroacetic acid, as eluent, with a flow rate of 1 ml/min and a column temperature of 35° C. The aqueous polymer dispersions are diluted in the eluent advantageously to a concentration of about 2 mg of polymer per ml, this solution is filtered on a 0.2 μm filter (Sartorius Minisart SRP 25) to remove any insoluble gel fraction, and 100 μl of the resultant filtered solution are injected. As columns, three columns having an internal diameter of 7.5 mm are combined as follows: 5 cm preliminary column (Plgel 10μ Guard preliminary column) followed by two 30 cm separating columns connected in series (each Plgel 10μ Mixed B). Detection takes place advantageously by means of an Agilent 1100 differential refractometer, Agilent 1100 VWD UV photometer, PSS SLD7000-BI-MwA (UV/254 nm/Agilent). The calibration is familiar to the skilled person and takes place using narrow-range polystyrene standards, for example from Polymer Laboratories, having molecular weights of Mw=580 to Mw=7 500 000, and also hexylbenzene (M=162).

The $T_g^1$ of the first stage polymer was measured according to DIN EN ISO 11357-2 (2013 September).

The solids contents were determined generally by drying a defined amount of the aqueous polymer dispersion (approximately 0.8 g) to constant weight at a temperature of 130° C., using an HR73 moisture analyzer from Mettler Toledo. Two measurements are carried out in each case, and it is the average of these two measurements that is reported.

The mean particle diameter of the polymer latex was determined by Hydrodynamic Chromatography fractionation (HDC), as for example described by H. Wiese, "Characterization of Aqueous Polymer Dispersions" in Polymer Dispersions and Their Industrial Applications (Wiley-VCH, 2002), pp. 41-73. Measurements were carried out using a PL-PSDA particle size distribution analyzer (Polymer Laboratories, Inc.). A small amount of sample of the polymer latex was injected into an aqueous eluent containing an emulsifier, resulting in a concentration of approximately 0.5 g/l. The mixture was pumped through a glass capillary tube of approximately 15 mm diameter packed with polystyrene spheres. As determined by their hydrodynamic diameter, smaller particles can sterically access regions of slower flow in capillaries, such that on average the smaller particles experience slower elution flow. The fractionation was finally monitored using an UV-detector which measured the extinction at a fixed wavelength of 254 nm.

EXAMPLE 1 (E1—INVENTIVE)

A 2 l-polymerization vessel equipped with metering devices and temperature regulation was charged at 20 to 25° C. (room temperature) under a nitrogen atmosphere with 301.2 g of deionized water and
6.0 g of a 15% strength by weight aqueous solution of sodium lauryl sulfate and this initial charge was heated to 80° C. with stirring. When this temperature had been reached, 11.0 g of feed 1 were added, followed by metered addition of 25.7 g of a 7% strength by weight aqueous solution of sodium peroxodisulfate over the course of 5 minutes, after which the batch was stirred at the aforementioned temperature for 5 minutes more.

Subsequently, with the temperature of 80° C. maintained, the remainder of feed 1 was metered in continuously over the course of 40 minutes at a constant flow rate. Thereafter the polymerization mixture was left to react for another 10 minutes at 80° C. After that, first 12.0 g of deionized water and subsequently 2.3 g of an 8% strength by weight aqueous ammonia solution were added. Thereafter, feed 2 was metered in continuously over the course of 90 minutes at a constant flow rate. 40 minutes after the start of feed 2, 3.5 g of a 10% strength by weight aqueous ammonia solution were added. After the end of feed 2, the polymerization mixture was left to react at 80° C. for 90 minutes more, and then 85.1 g of deionized water were added to the polymerization mixture. Thereafter the aqueous polymer dispersion obtained was cooled to room temperature and filtered through a 50 μm filter.

Feed 1 (homogeneous mixture of):
56.3 g of deionized water,
3.0 g of a 15% strength by weight aqueous solution of sodium lauryl sulfate,
4.5 g of 2-ethylhexyl 2-mercaptoethanoate,
10.8 g of Solvesso® 100 [aromatics-containing organic solvent from Exxon Mobil],
10.8 g of butyl glycol,
30.2 g of n-butyl acrylate,
13.5 g of styrene,
37.73 g of methyl methacrylate,
13.57 g of isobornyl methacrylate,
8.6 g of methacrylic acid, and
32.1 g of 2-hydroxyethyl methacrylate Feed 2 (homogeneous mixture of):
69.4 g of deionized water, 6.0 g of a 15% strength by weight aqueous solution of sodium lauryl sulfate,
1.8 g of 2-ethylhexyl 2-mercaptoethanoate,
25.2 g of Solvesso 100,
25.2 g of butyl glycol,
150.8 g of n-butyl acrylate,
76.31 g of methyl methacrylate,
31.67 g of isobornyl methacrylate, and
59.7 g of 2-hydroxyethyl methacrylate The resulting polymer dispersion had a solids content of 41.8 wt %. The mean particle diameter of the dispersion particles obtained was 163 nm. The hydroxyl number of the dispersion polymer was found to be 86 mg of KOH/g.

A 0.5 ml sample was taken from the reaction mixture immediately before the start of feed 2, and the weight-average molecular weight of the polymer from the first polymerization stage was found to be 10200 g/mol and the $T_g$ measured was 23.4° C. The overall polymer obtained in the dispersion had a weight-average molecular weight of 31600 g/mol.

COMPARATIVE EXAMPLE 1 (CE 1)

Comparative example 1 was prepared entirely in analogy to the preparation of inventive example 1, with the difference that the monomer composition of feed 1 and feed 2 was according table 1.

INVENTIVE EXAMPLES 2-6 (E2-E6)

Inventive examples 2-6 were prepared entirely in analogy to the preparation of inventive example 1, with the monomer composition of feed 1 and feed 2 was according table 1.

| Example | CE 1 | E2 | E3 | E4 | E5 | E6 |
|---|---|---|---|---|---|---|
| | | | Monomers in feed 1 | | | |
| n-butyl acrylate | 30.2 g | 30.2 g | 30.2 g | 30.2 g | 30.2 g | 30.2 g |
| styrene | 13.5 g | 13.5 g | 13.5 g | 13.5 g | 13.5 g | 13.5 g |
| methyl methacrylate | 51.3 g | 24.16 g | 37.73 g | 24.16 g | 37.73 g | 24.16 g |
| IBOMA | — | 27.14 g/ 6 pphm | — | — | | — |
| CHMA | — | — | 13.57 g/ 3 pphm | 27.14 g/ 6 pphm | | — |
| IPhMA | — | — | — | — | 13.57 g/ 3 pphm | 27.14 g/ 6 pphm |
| methacrylic acid | 8.6 g | 8.6 g | 8.6 g | 8.6 g | 8.6 g | 8.6 g |
| 2-hydroxyethyl methacrylate | 32.1 g | 32.1 g | 32.1 g | 32.1 g | 32.1 g | 32.1 g |
| | | | Monomers in feed 2 | | | |
| n-butyl acrylate | 150.8 g | 150.8 g | 150.8 g | 150.8 g | 150.8 g | 150.8 g |
| methyl methacrylate | 108.0 g | 44.65 g | 76.31 g | 44.65 g | 76.31 g | 44.65 g |
| IBOMA | — | 63.31 g/ 14 pphm | — | — | | — |
| CHMA | — | — | 31.67 g/ 7 pphm | 63.31 g/ 14 pphm | | — |
| IPhMA | — | — | — | — | 31.67 g/ 7 pphm | 63.31 g/ 14 pphm |
| 2-hydroxyethyl methacrylate | 59.7 g | 59.7 g | 59.7 g | 59.7 g | 59.7 g | 59.7 g |
| Solid content [wt %] | 42.8 | 41.9 | 43.8 | 43.7 | 42.4 | 42.5 |
| mean particle diameter [nm] | 139 | 126 | 123 | 122 | 116 | 107 |
| $M_w$ $1^{st}$stage [g/mol] | 10100 | 9910 | 12300 | 10800 | 11900 | 11900 |
| $T_g^1$ $1^{st}$stage polymer[2)] [° C.] | 22.7 | 23.6 | 20.6 | 18.5 | 19.3 | 18.9 |
| $M_w$ final [g/mol] | 36600 | 34300 | 39400 | 33900 | 39100 | 38600 |
| Hydroxyl number[1)] mg KOH/g polymer | 86 | 86 | 86 | 86 | 86 | 86 |

pphm: parts per hundred monomer (sum of total monomer amount 1 and total monomer amount 2)

[1)] calculated

[2)] measured

Use Examples

The polymer dispersions obtained in inventive examples 1, 2, 3 and 4 and in comparative examples 1 were adjusted to a solids content of 41.0 wt % by dilution with deionized water. Aqueous formulations were produced from the aqueous polymer dispersions thus obtained, by the following procedure.

Test Methods:

Cotton wool drying time: The coating composition was applied with a draw down bar on a glass plate to get a wet film thickness of 150 μm. After film application, a frayed cotton wool was swept without pressure across the surface of the coating every 5 to 10 minutes. At the beginning, cotton fibers were sticking to the coating. The time when no fibers remained attached to the coating, is referred to as the cotton wool drying time.

Sand through drying time: The coating composition was applied with a draw down bar on two glass plates to get a wet film thickness of 150 μm. A cylindrical funnel mounted on two small metal wheels, one on each side of the funnel outlet, was quickly placed on the glass plates with the wet film. The cylindrical funnel on wheels moves at constant velocity of 1 cm per hour over the wet film. When the film is not "through-cured", the wheels leave marks on the film. When the film is "through-cured", the wheels leave no marks on the film anymore. The length (1 cm length refers to 1 hour) of the marks of the wheels in the coating is referred to as sand through drying time.

Pendulum hardness [osc.]: The coating composition was applied with a draw down bar (gap=150 μm) on a 4 mm thick glass plate, which has been cleaned with acetone before, yielding a wet film. The coated glass plates were dried at 23° C., and the pendulum hardness was measured after 2 h, 4 h, 1 d, 7 d. After 7 days, the glass plates were additionally heated to 40° C., or 60° C. respectively (cf., tables) for 15 hours, and after cooling to 23° C., the pendulum hardness was measured again. The pendulum hardness was measured according to DIN EN ISO 1522: 2006 using the König pendulum.

PREPARATION OF FORMULATIONS

Examples Series 1—Clearcoats Using Basonat® HW 3280 MBA (Hydrophilically-Modified Polyisocyanate Based on HDI and IPDI)

Formulation

Formulation of Component A

All components were added under mixing. The pH-value of 100 g of the inventive dispersion was adjusted to 8-8.5 by adding a 1:1 mixture of dimethylethanolamine (DMEA): water. Deion. water is added in an amount that the final component A shows a solids content of 39% by weight. Subsequently, 1.29 g of Hydropalat® WE 3650 (from BASF; wetting agent) and 0.43 g of EFKA® SL 3035 (from BASF; slip/leveling agent) was added. The mixture was stirred at 400 rpm for 5 minutes, and then was left standing overnight to give the readily formulated component A.

Formulation of Component B

As component B, Basonat® HW 3280 MBA (from BASF; hydrophilically-modified polyisocyanate based on HDI and IPDI) was used as delivered.

Formulation of the Two-Component Clearcoat

Under mixing at 600 rpm, to 50 g of component A, 12 g of component B (corresponds to an index of 100, i.e., 1 NCO group of hardener on 1 OH group of binder) was added. The mixture was stirred at 1200 rpm for 2 minutes. Subsequently, 4 g of deion. water was added under mixing at 600 rpm. The mixture was stirred for 30 seconds at 600 rpm to give the clear coat at a solids content of ca. 44% by weight, which can be applied after waiting for 30 minutes.

TABLE 2

Pendulum hardness and drying times of Clearcoats with Dispersions CE1, E1-E6 and Basonat ® HW 3280 MBA (hydrophilically modified polyisocyanate based on HDI and IPDI)

| Clear-coat No. | Dispersion | Sand through drying [h] | Cotton wool drying [min] | Pendulum hardness [osc.] after 2 h/4 h/1 d/7 d/7 d at room temperature and additionally 15 h at 40° |
|---|---|---|---|---|
| 1 n.i | CE1 | 3.5 | 40 | 5/7/18/48/77 |
| 2 | E1 | 4.5 | 25 | 2/6/18/47/79 |
| 3 | E2 | 2.0 | 25 | 3/6/23/56/99 |
| 4 | E3 | 3.5 | 25 | 4/6/20/51/78 |
| 5 | E4 | 4.0 | 30 | 3/6/20/50/77 |
| 6 | E5 | 4.0 | 24 | 3/7/16/36/48 |
| 7 | E6 | 4.0 | 25 | 3/8/22/49/69 |

n.i.: Not according the invention

All examples according the invention show a very good drying time on cotton wool despite they are in equivalent monomer profiles.

Examples—Series 2: Clearcoats with Usage of Inventive Dispersion in Combination with a Basonat® HI 2000 NG (Low-Viscous HDI-Based Polyisocyanate)

Formulation

Formulation of Component A

All components were added under mixing. The pH-value of 100 g of the inventive dispersion was adjusted to 8-8.5 by adding a 1:1 mixture of dimethylethanolamine (DMEA): water. Deion. water is added in an amount that the final component A shows a solids content of 39% by weight. Subsequently, 1.29 g of Hydropalat® WE 3650 (from BASF; wetting agent) and 0.43 g of EFKA® SL 3035 (from BASF; slip/leveling agent) was added. The mixture was stirred at 400 rpm for 5 minutes, and then was left standing overnight to give the readily formulated component A.

Formulation of Component B

Under mixing at 600 rpm, Basonat® HI 2000 NG (from BASF; low viscous HDI-based polyisocyanate) was dissolved in Rhodiasolv® RPDE (from Solvay; mixture of dimethyl glutarate, dimethyl succinate, and dimethyl adipate) to give a 65% by weight solution. The mixture was mixed for 2 minutes at 600 rpm.

Formulation of the Two-Component Clearcoat

Under mixing at 600 rpm, to 100 g of component A, 29.3 g of component B (corresponds to an index of 150, i.e., 1.5 NCO groups of hardener on 1 OH group of binder) was added. The mixture was stirred at 1200 rpm for 2 min to give the clear coat at a solids content of ca. 45%, which can be applied after waiting for 30 min.

TABLE 3

Pendulum hardness of Clearcoats with Dispersions CE1, E1-E6 and a polyisocyanate as hardener (Basonat HI 2000 NG)

| Clearcoat No. | Dispersion | Pendulum hardness [osc.] after 2 h/4 h/1 d/3° d/7 d/7 d at room temperature + 15 h at 60° |
|---|---|---|
| 1 n.i | CE1 | 1/2/19/61/76/85 |
| 2 | E1 | 1/2/24/66/77/94 |
| 3 | E2 | 1/2/24/76/97/106 |
| 4 | E3 | 2/2/22/61/83/86 |
| 5 | E4 | 1/2/19/63/82/90 |
| 6 | E5 | 0/0/15/20/42/52 |
| 7 | E6 | 0/0/17/22/45/60 |

n.i.: Not according the invention

What is claimed is:

1. A process for preparing an aqueous polymer dispersion by radically initiated aqueous emulsion polymerization, which comprises polymerizing, in an aqueous polymerization medium a) in a first polymerization stage ≥5 and ≤10 wt % of at least one α,β-monoethylenically unsaturated $C_3$ to $C_6$ monocarboxylic or dicarboxylic acid (monomers A1), ≥15 and ≤35 wt % of at least one monoethylenically unsaturated compound having at least one hydroxyl group (monomers B1), ≥10 and ≤30 wt % of carboxyl-free (meth) acrylic esters with a cycloaliphatic structure (monomers C1), ≥45 and ≤70 wt % of at least one ethylenically unsaturated compound which is different from the monomers A1, B1 and C1 (monomers D1), the amounts of the monomers A1 to D1 adding up to 100 wt %, in the presence of at least one radical initiator and at least one chain transfer agent, and, optionally, in the presence of a dispersing assistant, with the provisos that the amount of chain transfer agent is selected such that the polymer 1 obtained from the first polymerization stage has a weight-average molecular weight in the range of ≥5000 and ≤40 000 g/mol, the nature and amounts of the monomers A1 to D1 are selected such that the resulting polymer 1 has a glass transition temperature $Tg^1$ as measured to DIN EN ISO 11357-2 (2013-09)≥15° C., and thereafter polymerizing, in the presence of the polymer 1 b) in a second polymerization stage

≥0 and ≤0.1 wt % of at least one α,β-monoethylenically unsaturated $C_3$ to $C_6$ monocarboxylic or dicarboxylic acid (monomers A2), ≥8 and ≤30 wt % of at least one monoethylenically unsaturated compound having at least one hydroxyl group (monomers B2), ≥5 and ≤20 wt % of carboxyl-free (meth)acrylic esters with a cycloaliphatic structure (monomers C2), ≥50 and ≤87 wt % of at least one ethylenically unsaturated compound which is different from the monomers A2, B2 and C2 (monomers D2), the amounts of the monomers A2 to D2 adding up to 100 wt %, in the presence of at least one radical initiator and at least one chain transfer agent, and, optionally, in the presence of a dispersing assistant, with the provisos that the weight ratio of the sum of the total amounts of monomers A1 to D1 (total monomer amount 1) to the sum of the total amounts of monomers A2 to D2 (total monomer amount 2) is in the range 25:75 to 50:50, the amount of chain transfer agent in the second polymerization stage is selected such that the overall polymer obtained after the second polymerization stage has a weight-average molecular weight≥5000 and ≤75 000/mol, and the amount of the dispersing assistant is ≤3.0 wt %, based on the sum of total monomer amount 1 and total monomer amount 2 (total monomer amount), that the sum of the total amounts of monomers C1 and C2 is 7 to 40 wt % based on the sum of total monomer amount 1 and total monomer amount 2.

2. The process according to claim 1, wherein the nature and amounts of the monomers A1 to D1 are selected such that the resulting polymer 1 has a glass transition temperature $Tg^1$ in the range≥15 and ≤75° C.

3. The process according to claim 1, wherein the amount of chain transfer agent in the first polymerization stage is selected such that the resulting polymer 1 has a weight-average molecular weight in the range of ≥7500 and ≤25 000 g/mol.

4. The process according to claim 1, wherein the amount of the dispersing assistant is ≥0.3 and ≤0.7 wt %, based on the total monomer amount.

5. The process according to claim 1, wherein the amount of chain transfer agent in the second polymerization stage is selected such that the resulting overall polymer has a weight-average molecular weight of ≥15 000 and ≤50 000 g/mol.

6. The process according to claim 1, wherein the monomers of the first and second polymerization stages are each used as monomer mixtures.

7. The process according to claim 6, wherein at least part of the monomer mixtures in each case is metered into the aqueous polymerization medium under polymerization conditions.

8. The process according to claim 1, wherein the first and/or second polymerization stages take place in the presence of an organic solvent having an evaporation number≥20, as determined to DIN 53170 (2009-08).

9. The process according to claim 8, wherein the total amount of the organic solvent is ≥1 and ≤25 wt %, based on the total monomer amount.

10. An aqueous polymer dispersion obtained by a process according to claim 1.

11. A method comprising providing the aqueous polymer dispersion according to claim 10 and incorporating the dispersion as a binder in the production of coatings, adhesives, sealants, synthetic resin renders, papercoating slips, nonwoven fiber webs, flexible roof coatings, and industrial and architectural coatings, as a component in the production of textile assistants or leather assistants, or for the modification of mineral binders and plastics.

12. An aqueous formulation comprising an aqueous polymer dispersion according to claim 10 and at least one component selected from the group comprising polyisocyanate, melamine-formaldehyde resin, and urea-formaldehyde resin.

13. A method comprising providing the aqueous formulation according to claim 12 and including the formulation as a component in the production of coating formulations.

14. A coating composition comprising at least one aqueous polymer dispersion according to claim 10 as binder, optionally at least one other binder, different from the aqueous polymer dispersion of the invention, at least one crosslinker selected from the group consisting of polyisocyanates, melamine-formaldehyde resins, and urea-formaldehyde resins, optionally at least one pigment, and optionally at least one corrosion inhibitor.

* * * * *